(12) United States Patent
Usoro et al.

(10) Patent No.: US 6,716,131 B1
(45) Date of Patent: Apr. 6, 2004

(54) FAMILY OF MULTI-SPEED POWER TRANSMISSIONS WITH THREE GEARSETS

(75) Inventors: Patrick Benedict Usoro, Troy, MI (US); Chi-Kuan Kao, Troy, MI (US); Madhusudan Raghavan, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/242,042

(22) Filed: Sep. 12, 2002

(51) Int. Cl.$^7$ ................................. F16H 3/62
(52) U.S. Cl. ................ 475/276; 475/280; 475/284; 475/314; 475/320; 475/326
(58) Field of Search ................ 475/275, 276, 475/296, 269, 323, 326, 320, 314, 280, 284

(56) References Cited

U.S. PATENT DOCUMENTS

| | | | | |
|---|---|---|---|---|
| 4,070,927 A | | 1/1978 | Polak | 74/765 |
| 4,709,594 A | | 12/1987 | Maeda | 74/753 |
| 5,007,887 A | * | 4/1991 | Asada | 475/284 |
| 5,106,352 A | | 4/1992 | Lepelletier | 475/280 |
| 5,542,889 A | * | 8/1996 | Pierce et al. | 475/275 |
| 5,599,251 A | | 2/1997 | Beim et al. | 475/275 |
| 6,053,839 A | | 4/2000 | Baldwin et al. | 475/281 |
| 6,071,208 A | | 6/2000 | Koivunen | 475/275 |
| 6,083,135 A | | 7/2000 | Baldwin et al. | 475/276 |
| 6,217,474 B1 | | 4/2001 | Ross et al. | 475/269 |
| 6,422,969 B1 | * | 7/2002 | Raghavan et al. | 475/276 |
| 6,514,170 B1 | * | 2/2003 | Kao et al. | 475/296 |
| 6,530,858 B1 | * | 3/2003 | Usoro et al. | 475/296 |

FOREIGN PATENT DOCUMENTS

| | | | | |
|---|---|---|---|---|
| DE | 4313289 | * | 10/1994 | 475/269 |
| EP | 1033510 | | 6/2000 | |
| JP | 9-126283 | | 5/1997 | |

* cited by examiner

*Primary Examiner*—Ha Ho
(74) *Attorney, Agent, or Firm*—Kathryn A. Marra

(57) ABSTRACT

A family of power transmissions, which are individually employed in a powertrain, include three planetary gearsets and five torque-transmitting mechanisms. The torque-transmitting mechanisms are engaged in combinations of two to establish a reverse speed ratio and at least six forward speed ratios between a transmission input shaft and a transmission output shaft. Each of the family members has a member of a first planetary gearset continuously connected with a member of the second planetary gearset, another member of the second planetary gearset continuously connected with a member of the third planetary gearset, and a third member of the second planetary gearset being continuously connected with a transmission housing. The input shaft and output shaft are continuously connected with at least one respective member of the planetary gearsets. At least two members of the planetary gearsets are non-continuously connected members. These members are components of the first or third planetary gearsets.

6 Claims, 11 Drawing Sheets

| | Ratios | 56 | 58 | 50 | 52 | 54 |
|---|---|---|---|---|---|---|
| Reverse | -3.71 | | X | X | | |
| Neutral | 0 | | X | | | |
| 1 | 4.03 | | X | | X | |
| | 2.31 | X | | | X | |
| 3 | 1.58 | | | X | X | |
| 4 | 1.17 | | | | X | X |
| 5 | 0.86 | | | X | | X |
| | 0.7 | X | | | | X |

$$\frac{Ring\ Gear}{Sun\ Gear} Tooth\ Ratio: \frac{R_1}{S_1} = 2.30, \frac{R_2}{S_2} = 2.95, \frac{R_3}{S_3} = 2.34$$

| Ratio Spread | 5.74 |
|---|---|
| Ratio Steps | |
| Rev/1 | -0.92 |
| 1/2 | 1.74 |
| 2/3 | 1.46 |
| 3/4 | 1.35 |
| 4/5 | 1.35 |
| 5/6 | 1.23 |

|  | Ratios | 156 | 158 | 150 | 152 | 154 |
|---|---|---|---|---|---|---|
| Reverse | -4.01 |  | X | X |  |  |
| Neutral | 0 |  | X |  |  |  |
| 1 | 4.23 |  | X |  |  | X |
| 2 | 2.47 | X |  |  |  | X |
| 3 | 1.72 |  |  | X |  | X |
| 4 | 1.2 |  |  |  | X | X |
| 5 | 0.85 |  |  | X | X |  |
| 6 | 0.7 | X |  |  | X |  |

$\dfrac{\text{Ring Gear}}{\text{Sun Gear}}$ Tooth Ratio: $\dfrac{R_1}{S_1} = 2.34, \dfrac{R_2}{S_2} = 2.52, \dfrac{R_3}{S_3} = 2.53$

| Ratio Spread | 6.04 |
|---|---|
| Ratio Steps |  |
| Rev/1 | -0.95 |
| 1/2 | 1.71 |
| 2/3 | 1.44 |
| 3/4 | 1.43 |
| 4/5 | 1.42 |
| 5/6 | 1.21 |

|  | Ratios | 256 | 258 | 250 | 252 | 254 |
|---|---|---|---|---|---|---|
| Reverse | -3.81 |  | X |  | X |  |
| Neutral | 0 |  | X |  |  |  |
| 1 | 4.32 |  | X |  |  | X |
| 2 | 2.43 | X |  |  |  | X |
| 3 | 1.62 |  |  |  | X | X |
| 4 | 1.17 |  |  | X |  | X |
| 5 | 0.86 |  |  | X | X |  |
| 6 | 0.7 | X |  | X |  |  |

Ring Gear / Sun Gear Tooth Ratio: $\frac{R_1}{S_1} = 2.47, \frac{R_2}{S_2} = 2.95, \frac{R_3}{S_3} = 2.34$

| Ratio Spread | 6.16 |
|---|---|
| Ratio Steps |  |
| Rev/1 | -0.88 |
| 1/2 | 1.78 |
| 2/3 | 1.5 |
| 3/4 | 1.39 |
| 4/5 | 1.36 |
| 5/6 | 1.23 |

|  | Ratios | 256 | 258 | 250 | 252 | 254 |
|---|---|---|---|---|---|---|
| Reverse | -3.73 | X |  | X |  |  |
| Neutral | 0 | X |  |  |  |  |
| 1 | 4.02 | X |  |  |  | X |
| 2 | 2.47 |  | X |  |  | X |
| 3 | 1.75 |  |  | X |  | X |
| 4 | 1.23 |  |  |  | X | X |
| 5 | 0.83 |  |  | X | X |  |
| 6 | 0.68 |  | X |  | X |  |

$\frac{Ring\ Gear}{Sun\ Gear}$ Tooth Ratio: $\frac{R_1}{S_1} = 2.14, \frac{R_2}{S_2} = 2.52, \frac{R_3}{S_3} = 2.63$

| Ratio Spread | 5.90 |
|---|---|
| Ratio Steps |  |
| Rev/1 | -0.93 |
| 1/2 | 1.63 |
| 2/3 | 1.41 |
| 3/4 | 1.42 |
| 4/5 | 1.47 |
| 5/6 | 1.22 |

| | Ratios | 458 | 450 | 452 | 454 | 456 |
|---|---|---|---|---|---|---|
| Reverse | -2.74 | X | | | | X |
| Neutral | 0 | X | | | | |
| 1 | 2.84 | X | | | X | |
| 2 | 1.6 | X | | X | | |
| 3 | 1 | | X | X | | |
| 4 | 0.73 | | | X | X | |
| 5 | 0.54 | | | X | | X |
| 6 | 0.4 | | | | X | X |

Ring Gear / Sun Gear Tooth Ratio: $\frac{R_1}{S_1} = 2.74$, $\frac{R_2}{S_2} = 1.52$, $\frac{R_3}{S_3} = 3.02$

| Ratio Spread | 7.16 |
|---|---|
| Ratio Steps | |
| Rev/1 | -0.96 |
| 1/2 | 1.78 |
| 2/3 | 1.6 |
| 3/4 | 1.38 |
| 4/5 | 1.34 |
| 5/6 | 1.37 |

| | Ratios | 558 | 550 | 552 | 554 | 556 |
|---|---|---|---|---|---|---|
| Reverse | -5.17 | X | | | | X |
| Neutral | 0 | X | | | | |
| 1 | 6.02 | X | | | X | |
| 2 | 3.32 | X | X | | | |
| 3 | 1.97 | | X | | X | |
| 4 | 1.51 | | X | | | X |
| 5 | 1.24 | | | X | X | |
| 6 | 1.00 | | | X | | X |

Ring Gear / Sun Gear Tooth Ratio: $\frac{R_1}{S_1} = 1.54, \frac{R_2}{S_2} = 2.37, \frac{R_3}{S_3} = 2.32$

| Ratio Spread | 6.02 |
|---|---|
| Ratio Steps | |
| Rev/1 | -0.86 |
| 1/2 | 1.81 |
| 2/3 | 1.69 |
| 3/4 | 1.31 |
| 4/5 | 1.21 |
| 5/6 | 1.24 |

| | Ratios | 658 | 650 | 652 | 654 | 656 |
|---|---|---|---|---|---|---|
| Reverse | -1.71 | | X | X | | |
| Neutral | 0.00 | | X | | | |
| 1 | 2.67 | X | X | | | |
| 2 | 1.87 | X | | | X | |
| 3 | 1.00 | X | | | X | |
| 4 | 0.70 | X | | | | X |
| 5 | 0.51 | | | X | | X |
| 6 | 0.44 | | X | | | X |

$\frac{\text{Ring Gear}}{\text{Sun Gear}}$ Tooth Ratio: $\frac{R_1}{S_1} = 1.67, \frac{R_2}{S_2} = 1.53, \frac{R_3}{S_3} = 2.34$

| Ratio Spread | 6.05 |
|---|---|
| Ratio Steps | |
| Rev/1 | -0.64 |
| 1/2 | 1.43 |
| 2/3 | 1.87 |
| 3/4 | 1.43 |
| 4/5 | 1.39 |
| 5/6 | 1.15 |

| | Ratios | 758 | 750 | 752 | 754 | 756 |
|---|---|---|---|---|---|---|
| Reverse | -5.59 | X | | | | X |
| Neutral | 0 | X | | | | |
| 1 | 5.61 | X | | | X | |
| 2 | 3.3 | X | | X | | |
| 3 | 1.87 | | | X | X | |
| 4 | 1.42 | | | X | | X |
| 5 | 1 | | X | X | | |
| 6 | 0.8 | | X | | X | |
| 7 | 0.74 | | X | | | X |

$\dfrac{\text{Ring Gear}}{\text{Sun Gear}}$ Tooth Ratio: $\dfrac{R_1}{S_1} = 2.30, \dfrac{R_2}{S_2} = 2.00, \dfrac{R_3}{S_3} = 1.87$

| Ratio Spread | 7.00(1/6) | 7.61(1/7) |
|---|---|---|
| Ratio Steps | | |
| Rev/1 | -1 | -1 |
| 1/2 | 1.7 | 1.7 |
| 2/3 | 1.77 | 1.77 |
| 3/4 | 1.31 | 1.31 |
| 4/5 | 1.42 | 1.42 |
| 5/6 | 1.25 | 1.25 |
| 6/7 | - | 1.09 |

| | Ratios | 858 | 850 | 852 | 854 | 856 |
|---|---|---|---|---|---|---|
| Reverse | -1.93 | | X | | X | |
| Neutral | 0.00 | | X | | | |
| 1 | 2.52 | | | X | X | |
| 2 | 1.52 | X | | | X | |
| 3 | 1.00 | | | X | X | |
| 4 | 0.62 | | | X | | X |
| 5 | 0.50 | | | | X | X |
| 6 | 0.45 | X | | | | X |
| 7 | 0.26 | | X | | | X |

$\frac{\text{Ring Gear}}{\text{Sun Gear}}$ Tooth Ratio: $\frac{R_1}{S_1} = 2.99$, $\frac{R_2}{S_2} = 1.52$, $\frac{R_3}{S_3} = 1.93$

| Ratio Spread | 5.58(1/6) | 9.54(1/7) |
|---|---|---|
| Ratio Steps | | |
| Rev/1 | -0.77 | -0.77 |
| 1/2 | 1.66 | 1.66 |
| 2/3 | 1.52 | 1.52 |
| 3/4 | 1.61 | 1.61 |
| 4/5 | 1.24 | 1.24 |
| 5/6 | 1.11 | 1.11 |
| 6/7 | - | 1.71 |

| | Ratios | 956 | 958 | 950 | 952 | 954 |
|---|---|---|---|---|---|---|
| Reverse | -1.99 | X | | | X | |
| Neutral | 0.00 | X | | | | |
| 1 | 2.86 | X | | | | X |
| 2 | 1.93 | | X | | | X |
| 3 | 1.32 | | | | X | X |
| 4 | 1.00 | | | X | | X |
| 5 | 0.67 | | | X | X | |
| 6 | 0.50 | | X | X | | |

Ring Gear / Sun Gear Tooth Ratio: $\frac{R_1}{S_1} = 1.86, \frac{R_2}{S_2} = 3.01, \frac{R_3}{S_3} = 2.98$

| Ratio Spread | 5.71 |
|---|---|
| Ratio Steps | |
| Rev/1 | -0.70 |
| 1/2 | 1.48 |
| 2/3 | 1.47 |
| 3/4 | 1.32 |
| 4/5 | 1.50 |
| 5/6 | 1.34 |

| | Ratios | 1058 | 1050 | 1052 | 1054 | 1056 |
|---|---|---|---|---|---|---|
| Reverse | -5.17 | X | | | | X |
| Neutral | 0.00 | X | | | | |
| 1 | 6.02 | X | | | X | |
| 2 | 3.32 | X | X | | | |
| 3 | 1.97 | | X | | X | |
| 4 | 1.51 | | X | | | X |
| 5 | 1.24 | | | X | X | |
| 6 | 1.00 | | | X | | X |

Ring Gear / Sun Gear Tooth Ratio: $\frac{R_1}{S_1} = 2.54, \frac{R_2}{S_2} = 2.37, \frac{R_3}{S_3} = 2.32$

| Ratio Spread | 6.02 |
|---|---|
| Ratio Steps | |
| Rev/1 | -0.86 |
| 1/2 | 1.81 |
| 2/3 | 1.69 |
| 3/4 | 1.31 |
| 4/5 | 1.21 |
| 5/6 | 1.24 |

FAMILY OF MULTI-SPEED POWER TRANSMISSIONS WITH THREE GEARSETS

TECHNICAL FIELD

This invention is related to multi-speed power transmission utilized in powertrains and capable of providing at least six forward speed ratios and one reverse speed ratio from three planetary gearsets and five torque-transmitting mechanisms.

BACKGROUND OF THE INVENTION

Passenger vehicles include a powertrain that is comprised of an engine, multi-speed transmission, and a differential or final drive mechanism. The multi-speed transmission increases the overall operating range of the vehicle by permitting the engine to operate through its torque range a number of times as the transmission ratios are interchanged. The number of forward speed ratios that are available in a transmission determines the number of ratio interchanges that can occur and therefore the number of times the engine torque range can be repeated.

Early automatic transmissions had two speed ranges. This severely limited the overall speed range of the vehicle and therefore required a relatively large engine that could produce a wide speed and torque range. This resulted in the engine operating at a specific fuel consumption point, during cruising, other than the most efficient point. Therefore, manually shifted (countershaft transmissions) were the most popular.

With the advent of three and four speed automatic transmissions, the automatic shifting (planetary gear) transmission increased in popularity with the motoring public. These transmissions improve the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to five and even six speeds. This has been accomplished in many heavy truck powertrains. Six speed transmissions are disclosed in U.S. Pat. No. 4,070,927 issued to Polak on Jan. 31, 1978; U.S. Pat. No. 6,071,208 issued to Koivunen on Jun. 6, 2000; U.S. Pat. No. 5,106,352 issued to Lepelletier on Apr. 21, 1992; and U.S. Pat. No. 5,599,251 issued to Beim and McCarrick on Feb. 4, 1997.

Six speed transmissions offer several advantages over four and five speed transmissions, including improved vehicle acceleration and improved fuel economy. While many trucks employ six-speed transmissions, such as Polak, passenger cars are still manufactured, for the main part, with three and four speed automatic transmissions, and relatively few five or six speed devices due to the size and complexity of these transmissions. The Polak transmission provides six forward speed ratios with three planetary gearsets, two clutches, and three brakes. The Koivunen and Beim patents utilize six torque transmitting devices including four brakes and two clutches to establish the six forward speed ratios and one reverse ratio. The Lepelletier patent employs three planetary gearsets, three clutches and two brakes to provide six forward speed ratios and one reverse ratio. One of the planetary gearsets in Lepelletier is positioned and operated to establish two fixed speed input members for the remaining two planetary gearsets.

SUMMARY OF THE INVENTION

It is an object of the present to provide an improved family of multi-speed power transmission mechanisms having three planetary gearsets.

In one aspect of the present invention, the power transmission has three planetary gearsets each with three rotatable members.

In another aspect of the present invention, the three rotatable members are comprised of a sun gear member, a ring gear member, and a planet carrier assembly member.

In yet another aspect of the present invention, a first member of the first planetary gearset is continuously connected with a first member of the second planetary gearset, a second member of the second planetary gearset is continuously connected with a first member of the third planetary gearset, and a third member of the second planetary gearset is continuously connected with a stationary portion of the transmission, such as a housing.

In still another aspect of the present invention, an input shaft is connected with a member of one of the planetary gearsets and an output shaft is connected with another member of one of the planetary gearsets.

In yet still another aspect of the present invention, each family member has five torque-transmitting mechanisms comprised of three rotating type torque-transmitting mechanisms and two stationary type torque-transmitting mechanisms in a plurality of the family members, and comprising four rotating type torque-transmitting mechanisms and one stationary type torque-transrmitting mechanism in a plurality of other members of the family.

In still another aspect of the present invention, a first of the torque-transmitting mechanisms selectively interconnects a member of the first planetary gearset with the input shaft, output shaft, one of the interconnecting members, or a member of the second or third planetary gearset.

In yet still another aspect of the present invention, a second of the torque-transmitting mechanisms selectively interconnects a member of the second planetary gearset with the input shaft, output shaft, one of the interconnecting members, or a member of the first or third planetary gearset.

In yet still another aspect of the present invention, a third of the torque-transmitting mechanisms selectively interconnects a member of the third planetary gearset with either the input shaft, the output shaft, one of the interconnecting members, or a member of the first or second planetary gearset.

In a further aspect of the present invention, a fourth of the torque-transmitting mechanisms either selectively connects a member of the first, second or third planetary gearset with another member of one of the planetary gearsets, or operates as a stationary torque-transmitting mechanism to selectively connect a member of the first or third planetary gearset with a stationary member of the transmission.

It is a yet further aspect of the present invention wherein a fifth of the torque-transmitting mechanisms selectively connects a member of one of the planetary gearsets with a stationary member of the transmission.

In yet still a further aspect of the present invention, the five torque-transmitting mechanisms are selectively engaged in combinations of two to yield at least six forward speed ratios and one reverse speed ratio between the input shaft and the output shaft of the transmission.

The present invention is defined in a family of transmissions incorporating a plurality of family members. Each family member includes three planetary gearsets and five torque-transmitting mechanisms. The first and second of the planetary gearsets are continuously interconnected with an interconnecting member between the first members of each planetary gearset. The second and third planetary gearsets are continuously interconnected with an interconnecting member between a second member of the second planetary gearset and a first member of the third planetary gearset. The third member of the second planetary gearset is continuously connected with a transmission housing. Therefore, the second planetary gearset does not include any non-continuously interconnected planetary members.

An input shaft is continuously connected with at least one member of the first or third of the planetary gearsets and an output shaft is continuously connected with another of the members of the first or third planetary gearsets. When the input shaft is connected with the first planetary gearset and the output shaft is connected with the third planetary gearset, each of these planetary gearsets have one member that is non-continuously interconnected. When both the input shaft and the output shaft are continuously connected with members of the same planetary gearset, then the other of the first or third planetary gearsets has two normally non-continuously interconnected members.

The five torque-transmitting mechanisms are selectively engageable to provide selective interconnections between the normally non-connected planetary members with either other normally non-connected planetary members, with a transmission housing, or with each other. The five torque-transmitting mechanisms comprise three clutches and two brakes in a plurality of the family members, and comprise four clutches and one brake in another plurality of the family members. In all of the family members, the five torque-transmitting mechanisms are engaged in combinations of two to establish at least six forward speed ratios and one reverse speed ratio between the input shaft and the output shaft.

In some of the family members, it is possible to provide seven forward speeds through the judicious selection of the torque-transmitting mechanisms in combinations of two. Each of the members of the planetary gearsets comprises either a sun gear member, a ring gear member, or a planet carrier assembly member. The planet carrier assembly member may be of the single pinion type, that is a single mesh between the sun gear member and the ring gear member, or of the double pinion type, that is a plurality of intermeshing pinion pairs, one meshing with the sun gear member and the other meshing with the ring gear member. Both types of these planetary gearset styles are well known.

The numerical value of these speed ratios, which are available or otherwise provided between the input shaft and the output shaft, are determined utilizing the ring gear/sun gear tooth ratios of the planetary gearsets. Since the five torque-transmitting mechanisms permit a variety of selective interconnections between the planetary gearsets, it is possible that the individual numerical values of the gear ratios will utilize more than one of the planetary gearsets, and in many cases, two or more of the speed ratios will utilize the same ring gear/sun gear tooth ratios. For example, the reverse speed ratio, the first forward speed ratio, and the fifth forward speed ratio might all utilize the ring gear/sun gear tooth ratios of all three of the planetary gearsets. However, in each of these ratios, the combination of torque-transmitting mechanisms provides different power paths through the planetary gearsets and therefore different numerical values for the speed ratios. This will be evident from the family members that are described below.

DESCRIPTIONS OF EXEMPLARY EMBODIMENTS

Figures 1, 2:
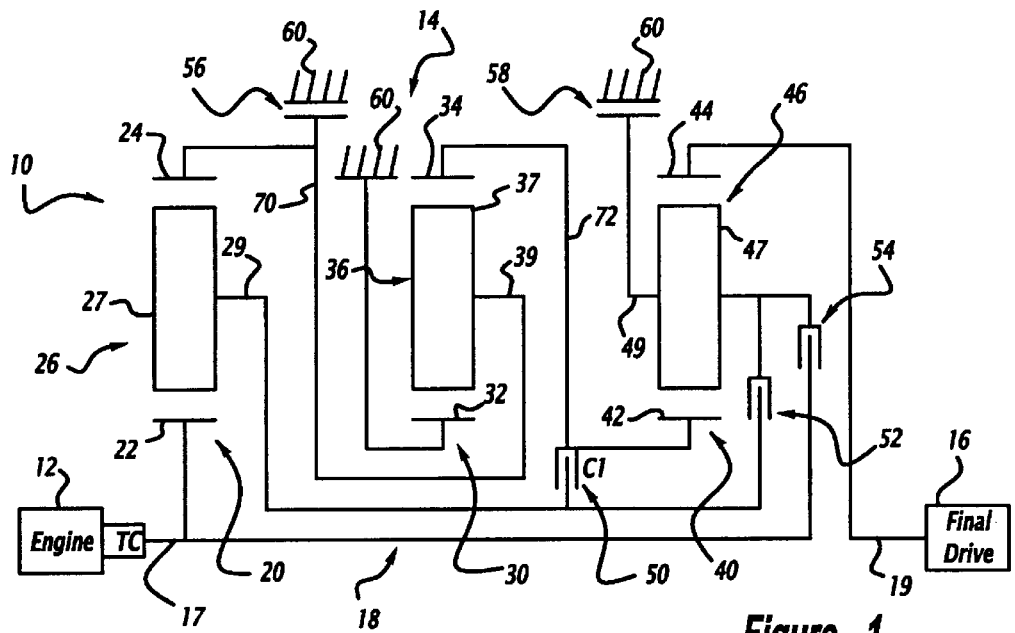
FIG. 1 is a schematic representation of a powertrain utilizing a family member incorporating the present invention.
FIG. 2 is a truth table and operating chart defining some of the operating characteristics of the transmission family member shown in FIG. 1, and the engagement sequence and combinations for the torque-transmitting mechanisms.

Referring to the drawings, wherein like characters represent the same or corresponding parts throughout the several views, there is shown in FIG. 1 a powertrain 10 having a conventional engine and torque converter 12, a planetary transmission 14, and a conventional final drive mechanism 16. The planetary transmission 14 includes an input shaft 17, a planetary gear arrangement 18, and an output shaft 19. The planetary gear arrangement 18 includes three planetary gearsets 20, 30, and 40, and five torque-transmitting mechanisms 50, 52, 54, 56, and 58. The torque-transmitting mechanisms 50, 52, and 54 are of the rotating type torque-transmitting mechanisms, commonly termed clutches, and the torque-transmitting mechanisms 56 and 58 are of the stationary type torque-transmitting mechanisms, commonly termed brakes or stationary clutches.

The planetary gearset 20 includes a sun gear member 22, a ring gear member 24, and a planet carrier assembly member 26. The planet carrier assembly member 26 includes a plurality of pinion gears 27 rotatably mounted on a planet carrier 29 and disposed in meshing relationship with both the sun gear member 22 and the ring gear member 24.

The planetary gearset 30 includes a sun gear member 32, a ring gear member 34, and a planet carrier assembly member 36. The planet carrier assembly member 36 includes a plurality of pinion gears 37 rotatably mounted on a planet carrier 39 and disposed in meshing relationship with both the sun gear member 32 and the ring gear member 34.

The planetary gearset 40 includes a sun gear member 42, a ring gear member 44, and a planet carrier assembly member 46. The planet carrier assembly member 46 includes a plurality of pinion gears 47 rotatably mounted on a planet carrier 49 and disposed in meshing relationship with both the sun gear member 42 and the ring gear member 44.

The ring gear member 24 and the planet carrier assembly member 36 are continuously interconnected by an interconnecting member 70 which is selectively connectible with a transmission housing 60 through the torque-transmitting mechanism 56. The sun gear member 32 is continuously connected with the transmission housing 60. The ring gear member 34 and sun gear member 42 are continuously interconnected by an interconnecting member 72, which is selectively connectible with the planet carrier assembly member 26 through the torque-transmitting mechanism 50. The input shaft 17 is continuously connected with the sun gear member 22 and selectively connectible with the planet carrier assembly member 46 through the torque-transmitting mechanism 54. The output shaft 19 is continuously connected with the ring gear member 44. The planet carrier assembly member 46 is selectively connectible with the planet carrier assembly member 26 through the torque-transmitting mechanism 52 and is also selectively connectible with the transmission housing 60 through the torque-transmitting mechanism 58.

It should be noted that the planet carrier assembly member 26 and the planet carrier assembly member 46 are not continuously connected with any other members of the other planetary gearsets, or with the transmission housing 60, or the input shaft 17, or the output shaft 19. In other words, these are normally noncontinuously connected members.

The truth table shown in FIG. 2 provides a pictorial view of the sequence of engagement and the combinations of engagement for the torque-transmitting mechanisms to establish a reverse speed ratio and six forward speed ratios between the input shaft 17 and the output shaft 19 through the planetary gear arrangement 18.

The reverse speed ratio is established with the engagement of the torque-transmitting mechanisms 50 and 58. During the reverse speed ratio, the ring gear member 24 and planet carrier assembly member 36 are driven at a speed determined by the speed of the sun gear member 22, the speed of the planet carrier assembly member 26, and the ring gear/sun gear tooth ratio of the planetary gearset 20. The ring gear member 34, sun gear member 42, and planet carrier assembly member 26 are driven at a speed determined by the speed of the planet carrier assembly member 36 and the ring gear/sun gear tooth ratio of the planetary gearset 30. The ring gear member 44 and therefore output shaft 19 are driven in reverse at a speed determined by the speed of the sun gear member 42 and the ring gear/sun gear tooth ratio of the planetary gearset 40. The numerical value of the reverse speed ratio is determined by the ring gear/sun gear tooth ratios of all three planetary gearsets 20, 30, and 40.

The first forward speed ratio is established with the engagement of the torque-transmitting mechanisms 52 and 58. It should be noted that the torque-transmitting mechanism 58 can remain engaged through a neutral condition to simply the forward/reverse interchange. During the first forward speed ratio, the ring gear member 24 and the planet carrier assembly member 36 are driven at a speed determined by the speed of the sun gear member 22 and the ring gear/sun gear tooth ratio of the planetary gearset 20. The ring gear member 34 and the sun gear member 42 are driven at a speed determined by the speed of the planet carrier assembly member 36 and the ring gear/sun gear tooth ratio of the planetary gearset 30. The ring gear member 44 and therefore output shaft 19 are driven at a speed determined by the speed determined by the speed of the sun gear member 42 and the ring gear/sun gear tooth ratio of the planetary gearset 40. The numerical value of the first forward speed ratio is determined by the ring gear/sun gear tooth ratios of all three planetary gearsets 20, 30, and 40.

The second forward speed ratio is established with the engagement of the torque-transmitting mechanisms 52 and 56. During the second forward speed ratio, the planet carrier assembly member 26 and planet carrier assembly member 46 are driven at a speed determined by the speed of the sun gear member 22 and the ring gear/sun gear tooth ratio of the planetary gearset 20. The output shaft 19 and ring gear member 44 are driven at a speed determined by the speed of the planet carrier assembly member 46 and the ring gear/sun gear tooth ratio of the planetary gearset 40. The numerical value of the second forward speed ratio is determined by the ring gear/sun gear tooth ratios of the planetary gearsets 20 and 40.

The third forward speed ratio is established with the engagement of the torque-transmitting mechanisms 50 and 52. During the second forward speed ratio, the ring gear member 24 and planet carrier assembly member 36 are driven at a speed determined by the speed of the sun gear member 22, the speed of the planet carrier assembly member 26, and the ring gear/sun gear tooth ratio of the planetary gearset 20. The sun gear member 42, planet carrier assembly member 46, ring gear member 44, ring gear member 34, and planet carrier assembly member 26 and therefore output shaft 19, are all driven at a speed determined by the speed of the planet carrier assembly member 36 and the ring gear/sun gear tooth ratio of the planetary gearset 30. The numerical value of the third forward speed ratio is determined by the ring gear/sun gear tooth ratios of the planetary gearsets 20 and 30.

The fourth forward speed ratio is established with the engagement of the torque-transmitting mechanisms 52 and 54. During the fourth forward speed ratio, the sun gear member 22, planet carrier assembly member 46, planet carrier assembly member 26, ring gear member 24, and planet carrier assembly member 36 are all driven at the speed of the input shaft 17. The ring gear member 34 and sun gear member 42 are driven at a speed determined by the speed of the planet carrier assembly member 36 and the ring gear/sun gear tooth ratio of the planetary gearset 30. The ring gear member 44 and therefore output shaft 19 are driven at a speed determined by the speed of the sun gear member 42, the speed of the planet carrier assembly member 46, and the ring gear/sun gear tooth ratio of the planetary gearset 40. The numerical value of the fourth forward speed ratio is determined by ring gear/sun gear tooth ratios of the planetary gearsets 30 and 40.

The fifth forward speed ratio is established with the engagement of the torque-transmitting mechanisms 50 and 54. During the fifth forward speed ratio, the ring gear member 24 and planet carrier assembly member 36 are driven at a speed determined by the speed of the sun gear member 22, the speed of the planet carrier assembly member 26, and the ring gear/sun gear tooth ratio of the planetary gearset 20. The ring gear member 34, the planet carrier assembly member 26, and sun gear member 42, are driven at a speed determined by the speed of the planet carrier assembly member 36 and the ring gear/sun gear tooth ratio of the planetary gearset 30. The ring gear member 44 and therefore output shaft 19 are driven at a speed determined by the speed of the sun gear member 42, the speed of the planet carrier assembly member 46, and the ring gear/sun gear tooth ratio of the planetary gearset 40. The numerical value of the fifth forward speed ratio is determined by the ring gear/sun gear tooth ratios of all three planetary gearsets 20, 30, and 40.

The sixth forward speed ratio is established with the engagement of the torque-transmitting mechanisms 54 and 56. During the sixth forward speed ratio, the entire planetary gearset 30, sun gear member 42, and ring gear member 24 are held stationary. The planet carrier assembly member 46 is driven in unison with the input shaft 17. The ring gear member 44 is driven forwardly at a speed determined by the speed of the planet carrier assembly member 46 and the ring gear/sun gear tooth ratio of the planetary gearset 40. The numerical value of the sixth forward speed ratio is determined by the ring gear/sun gear tooth ratio of the planetary gearset 40.

The truth table and chart shown in FIG. 2 provide an example of the numerical ratios possible with the planetary gear arrangement shown in FIG. 1. These numerical values are established utilizing the ring gear/sun gear tooth ratios that are also provided by way of example in FIG. 2. The R1/S1 value, R2/S2 value, and R3/S3 value, represent the ring gear/sun gear tooth ratios of the planetary gearsets 20, 30, and 40. Also given in FIG. 2 is a chart of the ratio steps between adjacent forward speed ratios and the ratio step between the reverse and first forward speed ratio, as well as the overall ratio spread of the forward speed ratios.

It is evident from the truth table that the single ratio interchanges are all of the single transition variety and that all of the double step ratio interchanges in the forward direction are also of the single transition variety.

Those skilled in the art will recognize that the reverse ratio, the first forward speed ratio, and the fifth forward speed ratio are all determined by the ring gear/sun gear tooth ratios of all three planetary gearsets 20, 30, and 40. This is possible because of the various kinematic arrangements that are established within the planetary gear arrangement 18 through the selective use of the torque-transmitting mechanisms in combinations of two. This, of course, will be true of all the family members which are described in the following figures. That is, the planetary gearsets are reused in a number of ways to permit the variety of transmission ratios.

Figures 3, 4:
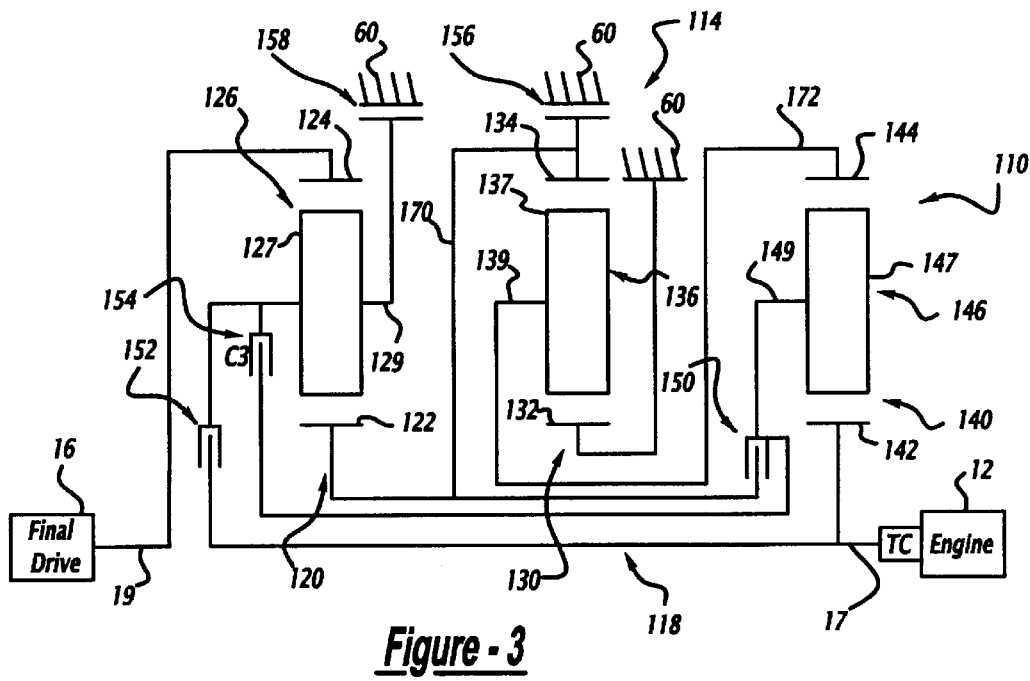
FIG. 3 is a schematic representation of a powertrain utilizing another family member incorporating the present invention.
FIG. 4 is a truth table and operating chart defining some of the operating characteristics of the transmission family member shown in FIG. 3, and the engagement sequence and combinations for the torque-transmitting mechanisms.

A powertrain 110, shown in FIG. 3, includes the engine and torque converter 12, a planetary transmission 114, and the final drive mechanism 16. The planetary transmission 114 includes the input shaft 17, a planetary gear arrangement 118, and the output shaft 19. The planetary gear arrangement 118 includes three planetary gearsets 120, 130, and 140, and five torque-transmitting mechanisms 150, 152, 154, 156, and 158. The torque-transmitting mechanisms 150, 152, and 154 are of the rotating type torque-transmitting mechanisms, commonly termed clutches, and the torque-transmitting mechanisms 156 and 158 are of the stationary type torque-transmitting mechanisms, commonly termed brakes or stationary clutches.

The planetary gearset 120 includes a sun gear member 122, a ring gear member 124, and a planet carrier assembly member 126. The planet carrier assembly member 126 includes a plurality of pinion gears 127 rotatably mounted on a planet carrier 129 and disposed in meshing relationship with both the sun gear member 122 and the ring gear member 124.

The planetary gearset 130 includes a sun gear member 132, a ring gear member 134, and a planet carrier assembly member 136. The planet carrier assembly member 136 includes a plurality of pinion gears 137 rotatably mounted on a planet carrier 139 and disposed in meshing relationship with both the sun gear member 132 and the ring gear member 134.

The planetary gearset 140 includes a sun gear member 142, a ring gear member 144, and a planet carrier assembly member 146. The planet carrier assembly member 146 includes a plurality of pinion gears 147 rotatably mounted on a planet carrier 149 and disposed in meshing relationship with both the sun gear member 142 and the ring gear member 144.

The sun gear member 122 and ring gear member 134 are continuously interconnected by an interconnecting member 170. The sun gear member 132 is continuously connected with the transmission housing 60. The planet carrier assembly member 136 and ring gear member 144 are continuously interconnected by an interconnecting member 172. The input shaft 17 is continuously connected with the sun gear member 142 and selectively connectible with the planet carrier assembly member 126 through the torque-transmitting mechanism 152. The output shaft 19 is continuously connected with the ring gear member 124. The planet carrier assembly member 126 is selectively connectible with the planet carrier assembly member 146 through the torque-transmitting mechanism 154, and selectively connectible with the transmission housing 60 through the torque-transmitting mechanism 158. The interconnecting member 170 is selectively connectible with the transmission housing 60 through the torque-transmitting mechanism 156, and selectively connectible with planet carrier assembly member 146 through the torque-transmitting mechanism 150.

The truth table of FIG. 4 describes the engagement combinations and sequences for the establishment of a reverse speed ratio and six forward speed ratios within the planetary gear arrangement 118.

To establish the reverse speed ratio, the torque-transmitting mechanisms 150 and 158 are engaged. During the reverse speed ratio, the ring gear member 144 and planet carrier assembly member 136 are driven at a speed determined by the speed of the sun gear member 144, the speed of the planet carrier assembly member 146, and the ring gear/sun gear tooth ratio of the planetary gearset 140. The ring gear member 134, sun gear member 122, and planet carrier assembly member 146 are driven at a speed determined by the speed of the planet carrier assembly member 136 and the ring gear/sun gear tooth ratio of the planetary gearset 130. The ring gear member 124 and output shaft 19 are driven at a speed determined by the speed of the sun gear member 122 and ring gear/sun gear tooth ratio of the planetary gearset 120. The numerical value of the reverse speed ratio is determined by the ring gear/sun gear tooth ratios of the planetary gearsets 120, 130, and 140.

The first forward speed ratio is established with the engagement of the torque-transmitting mechanisms 154 and 158. During the first forward speed ratio, the ring gear member 144 and planet carrier assembly member 136 are driven at a speed determined by the speed of the sun gear member 142 and the ring gear/sun gear tooth ratio of the planetary gearset 140. The ring gear member 134 and sun gear member 122 are driven at a speed determined by the speed of the planet carrier assembly member 136 and the ring gear/sun gear tooth ratio of the planetary gearset 130. The ring gear member 124 and output shaft 19 are driven at a speed determined by the speed of the sun gear member 122 and the ring gear/sun gear tooth ratio of the planetary gearset 120. The numerical value of the first forward speed ratio is determined by the ring gear/sun gear tooth ratios of the planetary gearsets 120, 130, and 140.

The second forward speed ratio is established with the engagement of the torque-transmitting mechanisms 154 and 156. During the second forward speed ratio, the planetary gearset 130 is held stationary, as is the ring gear member 144 and sun gear member 122. The planet carrier assembly member 146 and the planet carrier assembly member 126 are driven forwardly at a speed determined by the speed of the sun gear member 142 and the ring gear/sun gear tooth ratio of the planetary gearset 140. The ring gear member 124 and output shaft 19 are driven at a speed determined by the speed of the planet carrier assembly member 126 and the ring gear/sun gear tooth ratio of the planetary gearset 120. The numerical value of the second forward speed ratio is determined by ring gear/sun gear tooth ratios of the planetary gearsets 120 and 140.

The third forward speed ratio is established with the engagement of the torque-transmitting mechanisms 150 and 154. During the third forward speed ratio, the ring gear member 144 and the planet carrier assembly member 136 are driven at a speed determined by the speed of the sun gear member 142, the speed of the planet carrier assembly member 146, and ring gear/sun gear tooth ratio of the planetary gearset 140. The ring gear member 134, sun gear member 122, planet carrier assembly members 146 and 126, ring gear member 124, and output shaft 19 are driven at a speed determined by the speed of the planet carrier assembly member 136 and the ring gear/sun gear tooth ratio of the planetary gearset 130. The numerical value of the third forward speed ratio is determined by the ring gear/sun gear tooth ratios of the planetary gearsets 130 and 140.

The fourth forward speed ratio is established with the engagement of the torque-transmitting mechanisms 152 and 154. During the fourth forward speed ratio, the planetary gearset 140, the planet carrier assembly member 136, and the planet carrier assembly member 126 are driven at the speed of the input shaft 17. The ring gear member 134 and sun gear member 122 are driven at a speed determined by the speed of the planet carrier assembly member 136 and the ring gear/sun gear tooth ratio of the planetary gearset 130. The ring gear member 124 and output shaft 19 are driven at a speed determined by the speed of sun gear member 122, the speed of the planet carrier assembly member 126, and the ring gear/sun gear tooth ratio of the planetary gearset 120. The numerical value of the fourth forward speed ratio is determined by the ring gear/sun gear tooth ratios of the planetary gearsets 120 and 130.

The fifth forward speed ratio is established with the engagement of the torque-transmitting mechanisms 150 and 152. During the fifth forward speed ratio, the sun gear member 142 and planet carrier assembly member 126 are driven at the speed of the input shaft 17. The ring gear member 144 and planet carrier assembly member 136 are driven at a speed determined by the speed of the sun gear member 142, the speed of the planet carrier assembly member 146, and the ring gear/sun gear tooth ratio of the planetary gearset 140. The ring gear member 134, sun gear member 122, and planet carrier assembly member 146 are driven at a speed determined by the speed of the planet carrier assembly member 136 and the ring gear/sun gear tooth ratio of the planetary gearset 130. The ring gear member 124 and output shaft 19 are driven at a speed determined by the speed of the planet carrier assembly member 126, the speed of the sun gear member 122, and the ring gear/sun gear tooth ratio of the planetary gearset 120. The numerical value of the fifth forward speed ratio is determined by the ring gear/sun gear tooth ratios of the planetary gearsets 120, 130, and 140.

The sixth forward speed ratio is established with the engagement of the torque-transmitting mechanisms 152 and 156. During the sixth forward speed ratio, the planet carrier assembly member 126 is driven at the speed of the input shaft 17, and the sun gear member 122 is held stationary. The ring gear member 124 is determined by the speed of the planet carrier assembly member 126 and the ring gear/sun gear tooth ratio of the planetary gearset 120. The numerical value of the sixth forward speed ratio is determined by the ring gear/sun gear tooth ratio of the planetary gearset 120.

The truth table and chart of FIG. 4 describe the operating sequence for the torque-transmitting mechanisms. The truth table also provides an example of the numerical value of speed ratios that are available with the planetary gear arrangement 118 when utilizing the ring gear/sun gear tooth ratios given by way of example as R1/S1, R2/S2, and R3/S3 which represent the ring gear/sun gear tooth ratios of the planetary gearsets 120, 130, and 140, respectively.

The chart of FIG. 4 provides numerical values for the ratio steps between adjacent forward speed ratios as well as between the reverse speed ratio and the first forward speed ratio.

Figures 5, 6:
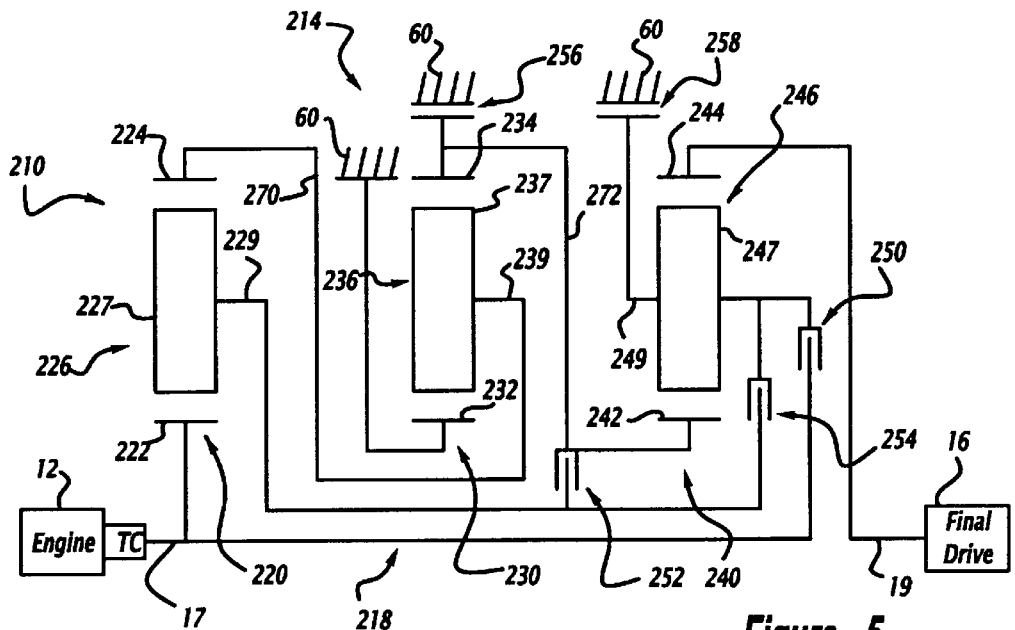
FIG. 5 is a schematic representation of a powertrain utilizing another family member incorporating the present invention.
FIG. 6 is a truth table and operating chart defining some of the operating characteristics of the transmission family member shown in FIG. 5, and the engagement sequence and combinations for the torque-transmitting mechanisms.

A powertrain 210, shown in FIG. 5, includes the engine and torque converter 12, a planetary transmission 214, and the final drive mechanism 16. The planetary transmission 214 includes the input shaft 17, a planetary gear arrangement 218, and the output shaft 19. The planetary gear arrangement 218 includes three planetary gearsets 220, 230, and 240, and five torque-transmitting mechanisms 250, 252, 254, 256, and 258. The torque-transmitting mechanisms 250, 252, and 254 are of the rotating type torque-transmitting mechanisms, commonly termed clutches, and the torque-transmitting mechanisms 256 and 258 are of the stationary type torque-transmitting mechanisms, commonly termed brakes or stationary clutches.

The planetary gearset 220 includes a sun gear member 222, a ring gear member 224, and a planet carrier assembly member 226. The planet carrier assembly member 226 includes a plurality of pinion gears 227 rotatably mounted on a planet carrier 229 and disposed in meshing relationship with both the sun gear member 222 and the ring gear member 224.

The planetary gearset 230 includes a sun gear member 232, a ring gear member 234, and a planet carrier assembly member 236. The planet carrier assembly member 236 includes a plurality of pinion gears 237 rotatably mounted on a planet carrier 239 and disposed in meshing relationship with both the sun gear member 232 and the ring gear member 234.

The planetary gearset 240 includes a sun gear member 242, a ring gear member 244, and a planet carrier assembly member 246. The planet carrier assembly member 246 includes a plurality of pinion gears 247 rotatably mounted on a planet carrier 249 and disposed in meshing relationship with both the sun gear member 242 and the ring gear member 244.

The ring gear member 224 is continuously connected with the planet carrier assembly member 236 by an interconnecting member 270. The ring gear member 234 and sun gear member 242 are continuously interconnected by an interconnecting member 272, and selectively connectible with the transmission housing 60 by the torque-transmitting mechanism 256. The sun gear member 232 is continuously connected with the transmission housing 60. The input shaft 17 is continuously connected with the sun gear member 222 and selectively connectible with the planet carrier assembly member 246 through the torque-transmitting mechanism 250. The output shaft 19 is continuously connectible with the ring gear member 244. The planet carrier assembly member 226 is selectively connectible with the interconnecting member 272 through the torque-transmitting mechanism 252, and selectively connectible with the planet carrier assembly member 246 through the torque-transmitting mechanism 254. The planet carrier assembly member 246 is selectively connectible with the transmission housing 60 through the torque-transmitting mechanism 258.

As shown in the truth table of FIG. 6 the torque-transmitting mechanisms are engageable in combinations of two to establish six forward speed ratios and one reverse speed ratio between the input shaft 17 and the output shaft 19 through the planetary gear arrangement 218.

The reverse speed ratio is established with the engagement of the torque-transmitting mechanisms 252 and 258. During the reverse speed ratio, ring gear member 224 and planet carrier assembly member 236 are driven a speed determined by the speed of the sun gear member 222, the speed of the planet carrier assembly member 226 and the ring gear/sun gear tooth ratio of the planetary gearset 220. The ring gear member 234, planet carrier assembly member 226, and sun gear member 242 are driven at a speed determined by the speed of the planet carrier assembly member 236 and the ring gear/sun gear tooth ratio of the planetary gearset 230. The ring gear member 244 and output shaft 19 are driven at a speed determined by the speed of the sun gear member 242 and the ring gear/sun gear tooth ratio of the planetary gearset 240. The numerical value of the reverse speed ratio is determined by the ring gear/sun gear tooth ratios of all three planetary gearsets 220, 230, and 240.

The first forward speed ratio is established by the engagement of the torque-transmitting mechanisms 254 and 258. During the first forward speed ratio, the ring gear member 224 and planet carrier assembly member 236 are driven at a speed determined by the speed of the sun gear member 222 and the ring gear/sun gear tooth ratio of the planetary gearset 220. The ring gear member 234 and sun gear member 242 are driven at a speed determined by the speed of the planet carrier assembly member 236 and the ring gear/sun gear tooth ratio of the planetary gearset 230. The ring gear member 244 and output shaft 19 are driven at a speed determined by the speed of the sun gear member 242 and the ring gear/sun gear tooth ratio of the planetary gearset 240. The numerical value of the first forward speed ratio is determined by the ring gear/sun gear tooth ratios of all three planetary gearsets 220, 230, and 240.

The second forward speed ratio is established with the engagement of the torque-transmitting mechanisms 254 and 256. During the second forward speed ratio, the planetary gearset 230 is held stationary, as is the ring gear member 224 and the sun gear member 242. The planet carrier assembly member 226 and planet carrier assembly member 246 are driven at a speed determined by the speed of the sun gear member 222 and the ring gear/sun gear tooth ratio of the planetary gearset 220. The ring gear member 244 and output shaft 19 are driven at a speed determined by the speed of the planet carrier assembly member 246 and the ring gear/sun gear tooth ratio of the planetary gearset 240. The numerical value of the second forward speed ratio is determined by the ring gear/sun gear tooth ratios of the planetary gearsets 220 and 240.

The third forward speed ratio is established with the engagement of the torque-transmitting mechanisms 252 and 254. It should be noted that the planetary gearset 240 will rotate as a single unit during this speed ratio. The ring gear member 224 and planet carrier assembly member 236 are driven at a speed determined by the speed of sun gear member 222, the speed of the planet carrier assembly member 226, and the ring gear/sun gear tooth ratio of the planetary gearset 220. The ring gear member 234, the planet carrier assembly member 226, the planetary gearset 240, and output shaft 19 are rotated at a speed determined by the speed of the planet carrier assembly member 236 and the ring gear/sun gear tooth ratio of the planetary gearset 230. The numerical value of the third forward speed ratio is determined by the ring gear/sun gear tooth ratios of the planetary gearsets 220 and 230.

The fourth forward speed ratio is established with the engagement of the torque-transmitting mechanisms 250 and 254. During the fourth forward speed ratio, the planetary gearset 220, planet carrier assembly member 236, and planet carrier assembly member 246 rotate in unison with the input shaft 17. The ring gear member 234 and sun gear member 242 are driven at a speed determined by the speed of the input shaft 17 and the ring gear/sun gear tooth ratio of the planetary gearset 230. The ring gear member 244 and output shaft 19 are driven at a speed determined by the speed of the sun gear member 242, the speed of the planet carrier assembly member 246, and the ring gear/sun gear tooth ratio of the planetary gearset 240. The numerical value of the fourth forward speed ratio is determined by the ring gear/sun gear tooth ratios of the planetary gearsets 230 and 240.

The fifth forward speed ratio is established with the engagement of the torque-transmitting mechanisms 250 and 252. During the fifth forward speed ratio, the sun gear member 222 and planet carrier assembly member 246 are driven at the speed of the input shaft 17. The ring gear member 224 and planet carrier assembly member 236 rotate at a speed determined by the speed of the sun gear member 222, the speed of the planet carrier assembly member 226, and the ring gear/sun gear tooth ratio of the planetary gearset 220. The ring gear member 234, planet carrier assembly member 226, and sun gear member 242 are rotated at a speed determined by the speed of the planet carrier assembly member 236 and the ring gear/sun gear tooth ratio of the planetary gearset 230. The ring gear member 244 and output shaft 19 are rotated at a speed determined by the speed of the sun gear member 242, the speed of the planet carrier assembly member 246, and the ring gear/sun gear tooth ratio of the planetary gearset 240. The numerical value of the fifth forward speed ratio is determined by the ring gear/sun gear tooth ratios of all three planetary gearsets 220, 230, and 240.

The sixth forward speed ratio is established with the engagement of the torque-transmitting mechanisms 250 and 256. During the sixth forward speed ratio, the planet carrier assembly member 246 is driven at the speed of the input shaft 17. The ring gear member 244 and therefore output shaft 19 are driven at a speed determined by the speed of the planet carrier assembly member 246 and the ring gear/sun gear tooth ratio of the planetary gearset 240. The numerical value of the sixth forward speed ratio is determined by the ring gear/sun gear tooth ratio of the planetary gearset 240.

The truth table and chart shown in FIG. 6 provide an example of the numerical values that can be obtained with the planetary gear arrangement 218 and utilizing the ring gear/sun gear tooth ratios given as R1/S1, R2/S2, and R3/S3 representing the ring gear/sun gear tooth ratios of the planetary gearsets 220, 230, and 240. Also provided in FIG. 6 is numerical values for the ratio steps between adjacent forward speed ratios as well as between the reverse and first forward speed ratio. The overall ratio spread in the forward direction is also provided in the chart.

As with the planetary gear arrangements described in FIGS. 1 and 3, the planetary gearsets are reused for a number of the forward speed ratios which is dependent upon the kinematic path established by the combinations of engagements of the various torque-transmitting mechanisms. In particular, the reverse speed ratio, the first forward speed ratio, and fifth forward speed ratio all utilize all three planetary gearsets and their ring gear/sun gear tooth ratios.

Figures 7, 8:
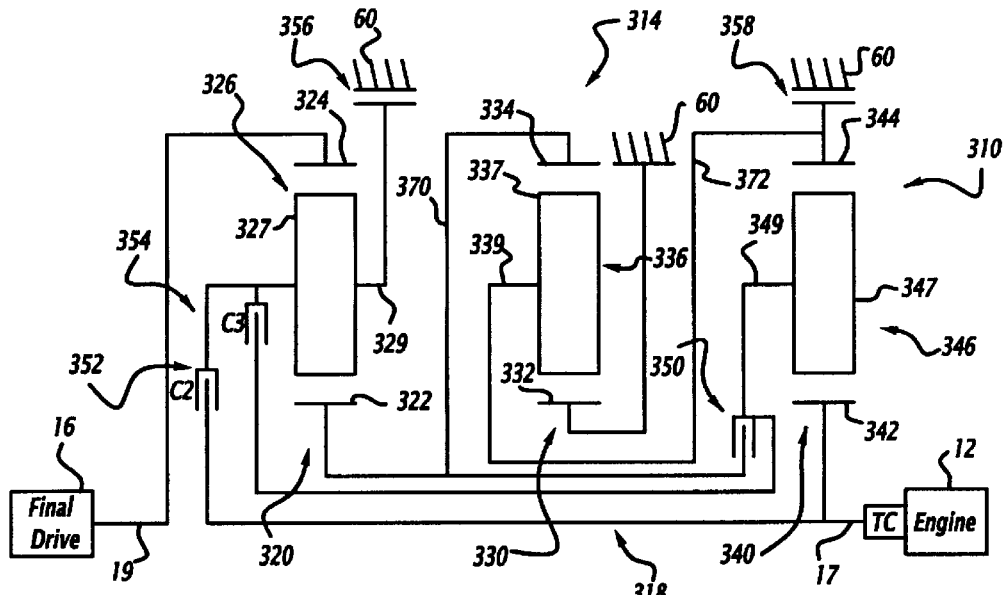
FIG. 7 is a schematic representation of a powertrain utilizing another family member incorporating the present invention.
FIG. 8 is a truth table and operating chart defining some of the operating characteristics of the transmission family member shown in FIG. 7, and the engagement sequence and combinations for the torque-transmitting mechanisms.

A powertrain 310, shown in FIG. 7, includes the engine and torque converter 12, a planetary transmission 314, and the final drive mechanism 16. The planetary transmission 314 includes the input shaft 17, a planetary gear arrangement 318, and the output shaft 19. The planetary gear arrangement 318 includes three planetary gearsets 320, 330, and 340, and five torque-transmitting mechanisms 350, 352, 354, 356, and 358. The torque-transmitting mechanisms 350, 352, and 354 are of the rotating type torque-transmitting mechanisms, commonly termed clutches, and the torque-transmitting mechanisms 356 and 358 are of the stationary type torque-transmitting mechanisms, commonly termed brakes or stationary clutches.

The planetary gearset 320 includes a sun gear member 322, a ring gear member 324, and a planet carrier assembly member 326. The planet carrier assembly member 326 includes a plurality of pinion gears 327 rotatably mounted on a planet carrier 329 and disposed in meshing relationship with both the sun gear member 322 and the ring gear member 324.

The planetary gearset 330 includes a sun gear member 332, a ring gear member 334, and a planet carrier assembly member 336. The planet carrier assembly member 336 includes a plurality of pinion gears 337 rotatably mounted on a planet carrier 339 and disposed in meshing relationship with both the sun gear member 332 and the ring gear member 334.

The planetary gearset 340 includes a sun gear member 342, a ring gear member 344, and a planet carrier assembly member 346. The planet carrier assembly member 346 includes a plurality of pinion gears 347 rotatably mounted on a planet carrier 349 and disposed in meshing relationship with both the sun gear member 342 and the ring gear member 344.

The sun gear member 322 is continuously connected with the ring gear member 334 through an interconnecting member 370. The planet carrier assembly member 336 is continuously connected with the ring gear member 344 through an interconnecting member 372. The sun gear member 332 is continuously connected with the transmission housing 60. The input shaft 17 is continuously connected with the sun gear member 342 and selectively connectible with the planet carrier assembly member 326 through the torque transmitting mechanism 352. The output shaft 19 is continuously connected with the ring gear member 324. The planet carrier assembly member 326 is selectively connectible with the planet carrier assembly member 346 through the torque-transmitting mechanism 354, and selectively connectible with the transmission housing 60 through the torque-transmitting mechanism 356. The interconnecting member 370 is selectively connectible with the planet carrier assembly member 346 through the torque-transmitting mechanism 350. The interconnecting member 372 is selectively connectible with the transmission housing 60 through the torque-transmitting mechanism 358. It should be noted that the planet carrier assembly member 346 and the planet carrier assembly member 326 are normally noncontinuously interconnected members in the planetary gear arrangement 318.

The truth table in FIG. 8 describes the engagement combinations for the torque-transmitting mechanisms, as well as the sequence of engagements to provide a reverse speed ratio and six forward speed ratios in the planetary gear arrangement 318 between the input shaft 17 and the output shaft 19.

To establish the reverse speed ratio, the torque-transmitting mechanisms 350 and 356 are engaged. During the reverse speed ratio, the ring gear member 344 and planet carrier assembly member 336 are driven at a speed determined by the speed of the sun gear member 342, the speed of the planet carrier assembly member 346, and the ring gear/sun gear tooth ratio of the planetary gearset 340. The ring gear member 334, the planet carrier assembly member 346, and sun gear member 322 are driven at a speed determined by the speed of the planet carrier assembly member 336 and the ring gear/sun gear tooth ratio of the planetary gearset 330. The ring gear member 324 and therefore output shaft 19 are driven at a speed determined by the speed of the sun gear member 322 and the ring gear/sun gear tooth ratio of the planetary gearset 320. The numerical value of the reverse speed ratio is determined by the ring gear/sun gear tooth ratios of all three planetary gearsets 320, 330, and 340.

The first forward speed ratio is established with the engagement of the torque-transmitting mechanisms 356 and 354. During the first forward speed ratio, the ring gear member 344 and the planet carrier assembly member 336 are driven at a speed determined by the speed of the sun gear member 342 and the ring gear/sun gear tooth ratio of the planetary gearset 340. The ring gear member 334 and sun gear member 322 are driven at a speed determined by the speed of the planet carrier assembly member 336 and the ring gear/sun gear tooth ratio of the planetary gearset 330. The ring gear member 324 and therefore output shaft 19 are driven at a speed determined by the speed of the sun gear member 322 and ring gear/sun gear tooth ratio of the planetary gearset 320. The numerical value of the first forward speed ratio is determined by the ring gear/sun gear tooth ratios of all three planetary gearsets 320, 330, and 340.

The second forward speed ratio is established with the engagement of the torque-transmitting mechanisms 354 and 358. During the second forward speed ratio, the planet carrier assembly member 346 and planet carrier assembly member 326 are driven forwardly at a speed determined by the speed of the sun gear member 342 and the ring gear/sun gear tooth ratio of the planetary gearset 340. The ring gear member 324 and therefore output shaft 19 are driven at a speed determined by the speed of the planet carrier assembly member 326 and the ring gear/sun gear tooth ratio of the planetary gearset 320. The numerical value of the second forward speed ratio is determined by the ring gear/sun gear tooth ratios of the planetary gearsets 320 and 340.

The third forward speed ratio is established with the engagement of the torque-transmitting mechanisms 350 and 354. During the third forward speed ratio, the ring gear member 344 and planet carrier assembly member 336 are driven at a speed determined by the speed of the sun gear member 342, the speed of the planet carrier assembly member 346, and the ring gear/sun gear tooth ratio of the planetary gearset 340. The ring gear member 334, planet carrier assembly member 346, and the entire planetary gearset 320, as well as the output shaft 19, are driven at a speed determined by the speed of the planet carrier assembly member 336 and the ring gear/sun gear tooth ratio of the planetary gearset 330. The numerical value of the third forward speed ratio is determined by the ring gear/sun gear tooth ratios of the planetary gearsets 330 and 340.

The fourth forward speed ratio is established with the engagement of the torque-transmitting mechanisms 352 and 354. During the fourth forward speed ratio, the planetary gearset 340 and the planet carrier assembly member 336 are driven as a unit by the input shaft 17. The ring gear member 334 and sun gear member 322 are driven at a speed determined by the speed of the planet carrier assembly member 336 and the ring gear/sun gear tooth ratio of the planetary gearset 330. The ring gear member 324 and therefore output shaft 19 are driven at a speed determined by the speed of the sun gear member 322, the speed of the planet carrier assembly member 326, and the ring gear/sun gear tooth ratio of the planetary gearset 320. The numerical value of the fourth forward speed ratio is determined by the ring gear/sun gear tooth ratios of the planetary gearsets 320 and 330.

The fifth forward speed ratio is established with the engagement of the torque-transmitting mechanisms 350 and 352. During the fifth forward speed ratio, the sun gear member 342 and planet carrier assembly member 326 are rotated by the input shaft 17. The ring gear member 344 and planet carrier assembly member 326 are driven at a speed determined by the speed of the input shaft 17, the speed of the planet carrier assembly member 346, and the ring gear/sun gear tooth ratio of the planetary gearset 340. The ring gear member 334 and sun gear member 322 are driven at a speed determined by the speed of the planet carrier assembly member 336 and the ring gear/sun gear tooth ratio of the planetary gearset 330. The ring gear member 324 and therefore output shaft 19 are driven at a speed determined by the speed of the sun gear member 322, the speed of the planet carrier assembly member 326, and the ring gear/sun gear tooth ratio of the planetary gearset 320. The numerical value of the fifth forward speed ratio is determined by the ring gear/sun gear tooth ratios of all three planetary gearsets 320, 330, and 340.

The sixth forward speed ratio is established with the engagement of the torque-transmitting mechanisms 352 and 358. During the sixth forward speed ratio, the planetary gearset 330, the sun gear member 322, and ring gear member 344 are all held stationary by the combination of torque-transmitting mechanisms 358 and the sun gear member 332. The planet carrier assembly member 326 is driven by the input shaft 17. The ring gear member 324 and therefore output shaft 19 are driven forwardly at a speed determined by the speed of the planet carrier assembly member 326 and the ring gear/sun gear tooth ratio of the planetary gearset 320. The numerical value of the sixth forward speed ratio is determined by the ring gear/sun gear tooth ratio of the planetary gearset 320.

As seen in FIG. 8, the truth table provides not only the combination and sequence of engagements but also an example of the numerical values of the ratios that might be produced by the planetary gear arrangement 318 when utilizing the ring gear/sun gear tooth ratios which are given by way of example as R1/S1, R2/S2, and R3/S3 which represent the ring gear/sun gear tooth ratios of the planetary gearsets 320, 330, and 340, respectively. Also given in FIG. 8 is a chart of the ratio steps between adjacent forward speed ratios as well the ratio step between the first forward speed ratio and the reverse speed ratio.

Figures 9, 10:
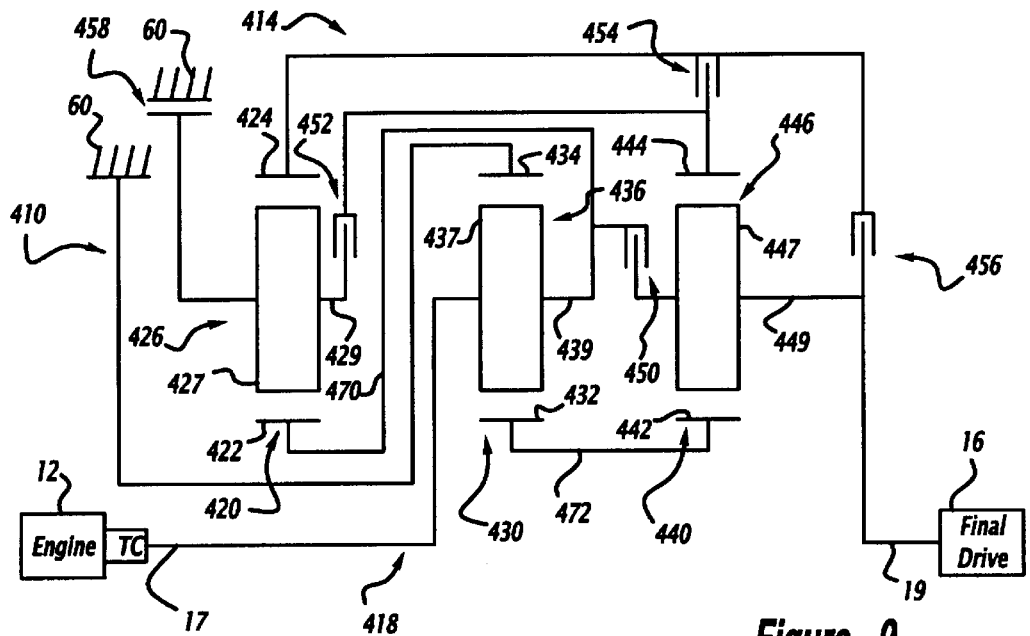
FIG. 9 is a schematic representation of a powertrain utilizing another family member incorporating the present invention.
FIG. 10 is a truth table and operating chart defining some of the operating characteristics of the transmission family member shown in FIG. 9, and the engagement sequence and combinations for the torque-transmitting mechanisms.

A powertrain 410, shown in FIG. 9, includes the engine and torque converter 12, a planetary transmission 414, and the final drive mechanism 16. The planetary transmission 414 includes the input shaft 17, a planetary gear arrangement 418, and the output shaft 19. The planetary gear arrangement 418 includes three planetary gearsets 420, 430, and 440, and five torque-transmitting mechanisms 450, 452, 454, 456, and 458. The torque-transmitting mechanisms 450, 452, 454, and 456 are of the rotating type torque-transmitting mechanisms, commonly termed clutches, and the torque-transmitting mechanism 458 is of the stationary type torque-transmitting mechanisms, commonly termed a brake.

The planetary gearset 420 includes a sun gear member 422, a ring gear member 424, and a planet carrier assembly member 426. The planet carrier assembly member 426 includes a plurality of pinion gears 427 rotatably mounted on a planet carrier 429 and disposed in meshing relationship with both the sun gear member 422 and the ring gear member 424.

The planetary gearset 430 includes a sun gear member 432, a ring gear member 434, and a planet carrier assembly member 436. The planet carrier assembly member 436 includes a plurality of pinion gears 437 rotatably mounted on a planet carrier 439 and disposed in meshing relationship with both the sun gear member 432 and the ring gear member 434.

The planetary gearset 440 includes a sun gear member 442, a ring gear member 444, and a planet carrier assembly member 446. The planet carrier assembly member 446 includes a plurality of pinion gears 447 rotatably mounted on a planet carrier 449 and disposed in meshing relationship with both the sun gear member 442 and the ring gear member 444.

The sun gear member 422 is continuously connected with the planet carrier assembly member 436 through an interconnecting member 470. The sun gear member 432 is continuously connected with the sun gear member 442 through an interconnecting member 472. The input shaft 17 is continuously connected with the interconnecting member 470 and selectively connectible with the planet carrier assembly member 446 through the torque-transmitting mechanism 450. The output shaft 19 is continuously connected with the planet carrier assembly member 446 and selectively connectible with the ring gear member 424 through the torque-transmitting mechanism 456. The planet carrier assembly member 426 is selectively connectible with the ring gear member 444 through the torque-transmitting mechanism 452, and selectively connectible with the transmission housing 60 through the torque-transmitting mechanism 458. The ring gear member 434 is continuously connected with the transmission housing 60. The ring gear member 424 is selectively connectible with the ring gear member 444 through the torque-transmitting mechanism 454.

It should be noted that in the planetary gear arrangement 418 that each of the planetary members of the planetary gearsets 430 are continuously connected either to a member of another planetary gearset, to the input or the transmission housing. Two of the members of the planetary gearset 440 are continuously interconnected with a member of one of the other planetary gearsets or to the output shaft and one member that is not interconnected with other components except through the torque transmitting mechanisms. The planetary gearset 420 has two planetary members, the planet carrier assembly member 426 and the ring gear member 424, that are not continuously connected with other components of the planetary gear arrangement 418.

The truth table and chart of FIG. 10 describe the combination of engagements for the torque-transmitting mechanisms in order to produce a reverse speed and six forward speed ratios through the planetary gear arrangement 418 between the input shaft 17 and the output shaft 19. The truth table also provides a numerical example of the ratios that are available in reverse and the six forward speed ratios. These numerical values are determined utilizing the ring gear/sun gear tooth ratios R1/S1, R2/S2, and R3/S3 which are the ring gear/sun gear tooth ratios of the planetary gearsets 420, 430, and 440, respectively.

Those skilled in the art will recognize that the numerical value of the reverse speed ratio is established by the ring gear/sun gear tooth ratio of the planetary gearset 420. The numerical value of the first forward speed ratio is determined by the ring gear/sun gear tooth ratios of all three planetary gearsets 420, 430, and 440. The numerical value of the second forward speed ratio is determined by the ring gear/sun gear tooth ratios of the planetary gearsets 430 and 440. The numerical value of the third forward speed ratio is one, or a direct drive. The numerical value of the fourth forward speed ratio is determined by the ring gear/sun gear tooth ratios of the planetary gearsets 430 and 440. The numerical value of the fifth forward speed ratio is determined by the ring gear/sun gear tooth ratios of all three planetary gearsets 420, 430, and 440. The numerical value of the sixth forward speed ratio is determined by the ring gear/sun gear tooth ratio of the planetary gearset 430.

Also given in the charts in FIG. 10 is the value for the ratio steps between adjacent forward speed ratios as well as between the reverse ratio and the first forward speed ratio. The chart also provides the numerical value for the overall ratio spread of the forward ratios.

Figures 11, 12:
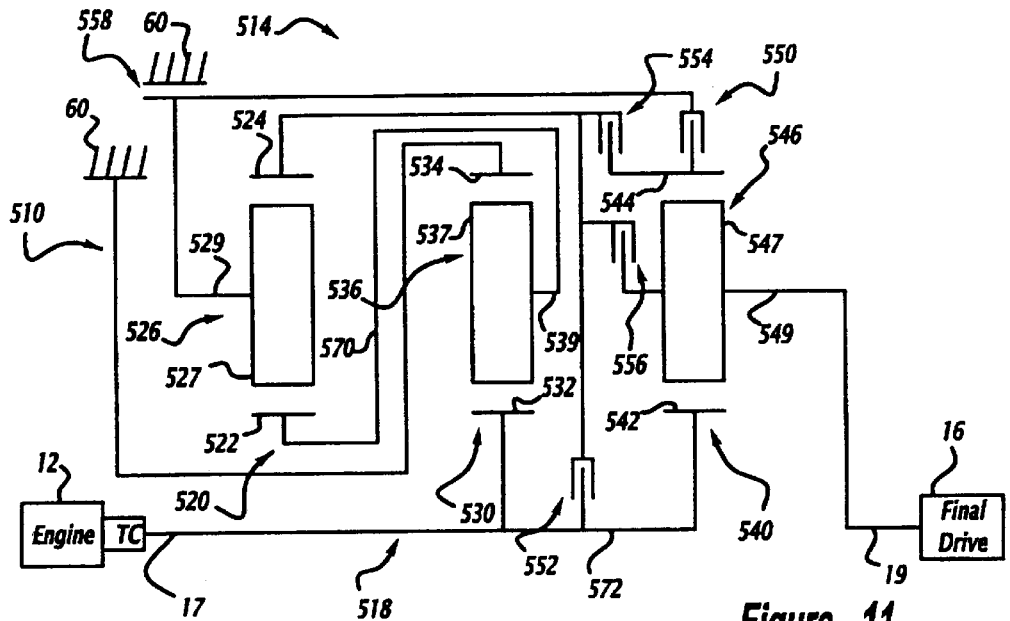
FIG. 11 is a schematic representation of a powertrain utilizing another family member incorporating the present invention.
FIG. 12 is a truth table and operating chart defining some of the operating characteristics of the transmission family member shown in FIG. 11, and the engagement sequence and combinations for the torque-transmitting mechanisms.

A powertrain 510, shown in FIG. 11, includes the engine and torque converter 12, a planetary transmission 514, and the final drive mechanism 16. The planetary transmission 514 includes the input shaft 17, a planetary gear arrangement 518, and the output shaft 19. The planetary gear arrangement 518 includes three planetary gearsets 520, 530, and 540, and five torque-transmitting mechanisms 550, 552, 554, 556, and 558. The torque-transmitting mechanisms 550, 552, 554, and 556 are of the rotating type torque-transmitting mechanisms, commonly termed clutches, and the torque-transmitting mechanism 558 is of the stationary type torque-transmitting mechanisms, commonly termed a brake.

The planetary gearset 520 includes a sun gear member 522, a ring gear member 524, and a planet carrier assembly member 526. The planet carrier assembly member 526 includes a plurality of pinion gears 527 rotatably mounted on a planet carrier 529 and disposed in meshing relationship with both the sun gear member 522 and the ring gear member 524.

The planetary gearset 530 includes a sun gear member 532, a ring gear member 534, and a planet carrier assembly member 536. The planet carrier assembly member 536 includes a plurality of pinion gears 537 rotatably mounted on a planet carrier 539 and disposed in meshing relationship with both the sun gear member 532 and the ring gear member 534.

The planetary gearset 540 includes a sun gear member 542, a ring gear member 544, and a planet carrier assembly member 546. The planet carrier assembly member 546 includes a plurality of pinion gears 547 rotatably mounted on a planet carrier 549 and disposed in meshing relationship with both the sun gear member 542 and the ring gear member 544.

The sun gear member 522 is continuously connected with the planet carrier assembly member 536 through an interconnecting member 570. The input shaft 17, the sun gear member 532, and sun gear member 542 are continuously interconnected by an interconnecting member 572. The ring gear member 534 is continuously connected with the transmission housing 60. The output shaft 19 is continuously interconnected with the planet carrier assembly member 546. The input shaft 17 and interconnecting member 572 are selectively connectible with the ring gear member 524 through the torque-transmitting mechanism 552. The planet carrier assembly member 546 and output shaft 19 are selectively interconnectible with the ring gear member 524 through the torque-transmitting mechanism 556. The ring gear member 544 is selectively interconnectible with the ring gear member 524 through the torque-transmitting mechanism 554, and is selectively connectible with the planet carrier assembly member 526 through the torque-transmitting mechanism 550. The planet carrier assembly member 526 is selectively interconnectible with the transmission housing 60 through the torque-transmitting mechanism 558.

The planetary gear arrangement 518 has two members of the planetary gearset 520 that are not continuously interconnected with other members of the planetary gear arrangement 518, and the planetary gearset 540 also has one member; namely, ring gear member 544 that is noncontinuously connected with any other component of the planetary gear arrangement 518.

The truth table in FIG. 12 describes the engagement combinations and sequence for the torque-transmitting mechanisms in order to establish a reverse ratio and six forward speed ratios between the input shaft 17 and the output shaft 19 through the planetary gear arrangement 518. The truth table also provides an example of numerical values that be might obtained with the planetary gear arrangement 518 utilizing the ring gear/sun gear tooth ratios given as R1/S1, R2/S2, and R3/S3 of the planetary gearsets 520, 530, and 540, respectively.

Those skilled in the art will recognize that the reverse speed ratio has a numerical value determined by the ring gear/sun gear tooth ratios of the planetary gearsets 520 and 530. The first forward speed ratio, the fourth forward speed ratio, and fifth forward speed ratio have numerical values that are determined utilizing the ring gear/sun gear tooth ratios of all three planetary gearsets 520, 530, and 540. The second forward speed ratio has a numerical value determined by the ring gear/sun gear tooth ratio of the planetary gearset 540. The third forward speed ratio has a numerical value determined by the ring gear/sun gear tooth ratios of the planetary gearsets 530 and 540. The numerical value of the sixth forward speed ratio is one, or a direct drive.

The ratio steps between adjacent forward speed ratios are given in the chart of FIG. 12, as is the ratio step between the reverse and the first forward speed ratio. Another fact that should be considered from the truth table is that all of the single step interchanges between adjacent forward speed ratios are of the single transition variety. Also, all of the double step interchanges are of the single transition variety.

Figures 13, 14:
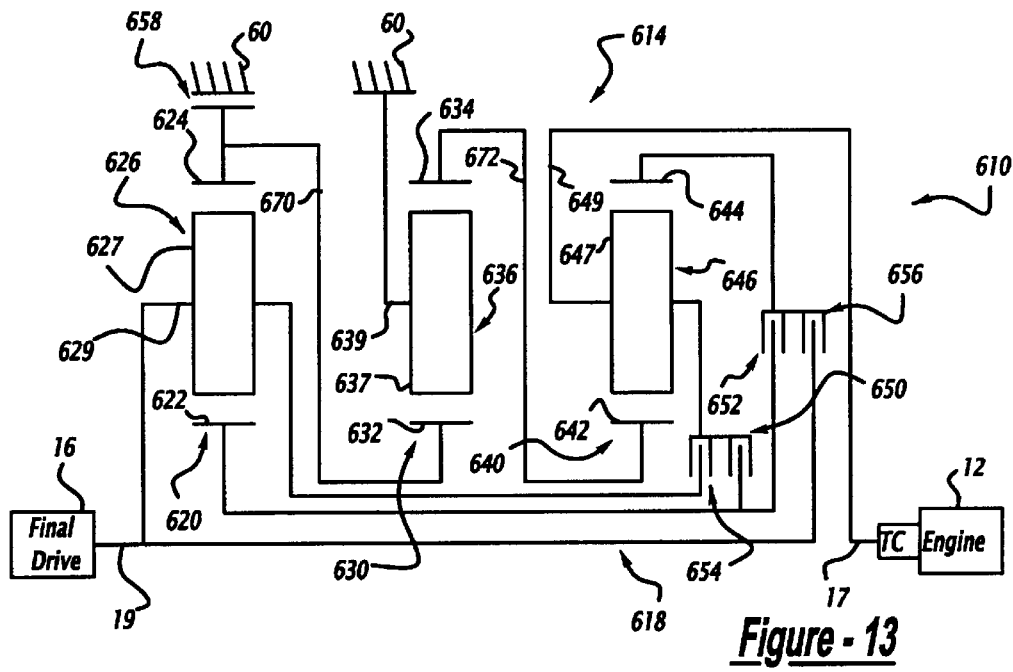
FIG. 13 is a schematic representation of a powertrain utilizing another family member incorporating the present invention.
FIG. 14 is a truth table and operating chart defining some of the operating characteristics of the transmission family member shown in FIG. 13, and the engagement sequence and combinations for the torque-transmitting mechanisms.

A powertrain 610, shown in FIG. 13, includes the engine and torque converter 12, a planetary transmission 614, and the final drive mechanism 16. The planetary transmission 614 includes the input shaft 17, a planetary gear arrangement 618, and the output shaft 19. The planetary gear arrangement 618 includes three planetary gearsets 620, 630, and 640, and five torque-transmitting mechanisms 650, 652, 654, 656, and 658. The torque-transmitting mechanisms 650, 652, 654, and 656 are of the rotating type torque-transmitting mechanisms, commonly termed clutches, and the torque-transmitting mechanism 658 is of the stationary type torque-transmitting mechanisms, commonly termed a brake.

The planetary gearset 620 includes a sun gear member 622, a ring gear member 624, and a planet carrier assembly member 626. The planet carrier assembly member 626 includes a plurality of pinion gears 627 rotatably mounted on a planet carrier 629 and disposed in meshing relationship with both the sun gear member 622 and the ring gear member 624.

The planetary gearset 630 includes a sun gear member 632, a ring gear member 634, and a planet carrier assembly member 636. The planet carrier assembly member 636 includes a plurality of pinion gears 637 rotatably mounted on a planet carrier 639 and disposed in meshing relationship with both the sun gear member 632 and the ring gear member 634.

The planetary gearset 640 includes a sun gear member 642, a ring gear member 644, and a planet carrier assembly member 646. The planet carrier assembly member 646 includes a plurality of pinion gears 647 rotatably mounted on a planet carrier 649 and disposed in meshing relationship with both the sun gear member 642 and the ring gear member 644.

The ring gear member 624 and the sun gear member 632 are continuously interconnected by an interconnecting member 670. The ring gear member 634 and sun gear member 642 are continuously interconnected by an interconnecting member 672. The input shaft 17 is continuously interconnected with the planet carrier assembly member 646. The output shaft 19 is continuously interconnected with the planet carrier assembly member 626, selectively connectible with the ring gear member 644 through the torque-transmitting mechanism 656, and selectively connectible with the planet carrier assembly member 646 through the torque-transmitting mechanism 654. The sun gear member 622 is selectively interconnectible with the ring gear member 644 through the torque-transmitting mechanism 652. The planet carrier assembly member 636 is continuously connected with the transmission housing 60. The interconnecting member 670 is selectively connectible with the transmission housing 60 through the torque-transmitting mechanism 658.

The truth table of FIG. 14 describes the combination of engagements and sequence for establishing a reverse speed ratio and six forward speed ratios between the input shaft 17 and the output shaft 19 through the planetary gear arrangement 618. The truth table also provides a numerical example of the ratios that are available with the planetary gear arrangement 618 in utilizing the ring gear/sun gear tooth ratios of the planetary gearsets 620, 630, and 640 as represented by R1/S1, R2/S2, and R3/S3 respectively.

The reverse speed ratio has a numerical value that is determined by the ring gear/sun gear tooth ratios of the planetary gearsets 620 and 630. The first forward speed ratio has a numerical value determined by the ring gear/sun gear tooth ratio of the planetary gearset 620. The second forward speed ratio has a numerical value determined by the ring gear/sun gear tooth ratios of the planetary gearsets 620 and 640. The third forward speed ratio has a numerical value of one. The fourth forward speed ratio has a numerical value determined by the ring gear/sun gear tooth ratio of the planetary gearset 640. The fifth forward speed ratio has a numerical value determined by the ring gear/sun gear tooth ratios of the planetary gearsets 630 and 640. The sixth forward speed ratio has a numerical value determined by the ring gear/sun gear tooth ratios of all three planetary gearsets 620, 630, and 640.

The chart of FIG. 14 depicts the ratio steps between adjacent forward speed ratios as well as between the reverse and the first forward speed ratio that are obtained when the numerical ring gear/sun gear tooth ratio examples are utilized.

Figures 15, 16:
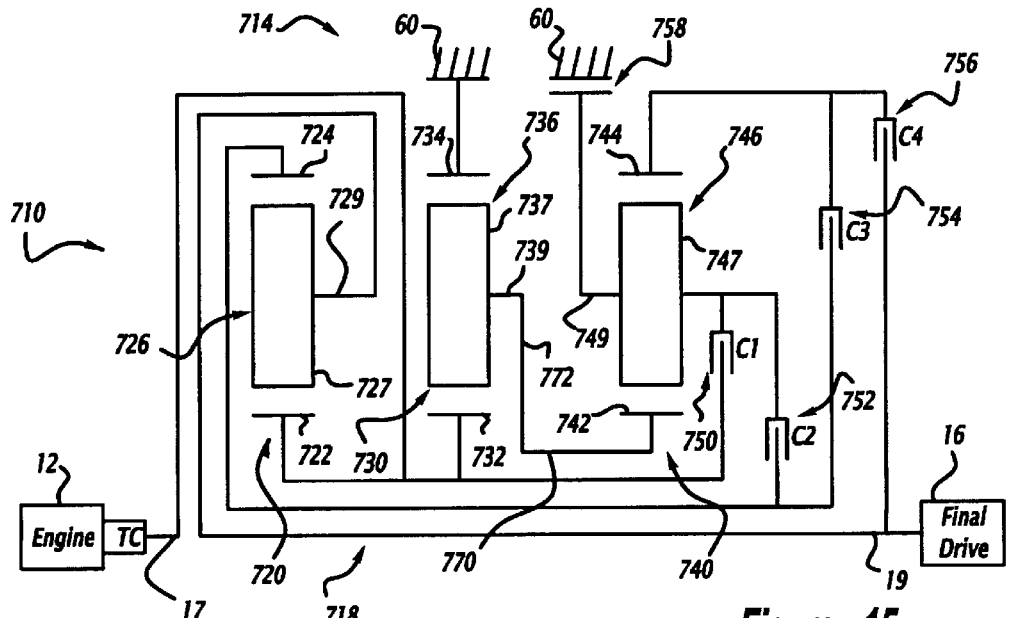
FIG. 15 is a schematic representation of a powertrain utilizing another family member incorporating the present invention.
FIG. 16 is a truth table and operating chart defining some of the operating characteristics of the transmission family member shown in FIG. 15, and the engagement sequence and combinations for the torque-transmitting mechanisms.

A powertrain 710, shown in FIG. 15, includes the engine and torque converter 12, a planetary transmission 714, and the final drive mechanism 16. The planetary transmission 714 includes the input shaft 17, a planetary gear arrangement 718, and the output shaft 19. The planetary gear arrangement 718 includes three planetary gearsets 720, 730, and 740, and five torque-transmitting mechanisms 750, 752, 754, 756, and 758. The torque-transmitting mechanisms 750, 752, 754, and 756 are of the rotating type torque-transmitting mechanisms, commonly termed clutches, and the torque-transmitting mechanism 758 is of the stationary type torque-transmitting mechanisms, commonly termed a brake.

The planetary gearset 720 includes a sun gear member 722, a ring gear member 724, and a planet carrier assembly member 726. The planet carrier assembly member 726 includes a plurality of pinion gears 727 rotatably mounted on a planet carrier 729 and disposed in meshing relationship with both the sun gear member 722 and the ring gear member 724.

The planetary gearset 730 includes a sun gear member 732, a ring gear member 734, and a planet carrier assembly member 736. The planet carrier assembly member 736 includes a plurality of pinion gears 737 rotatably mounted on a planet carrier 739 and disposed in meshing relationship with both the sun gear member 732 and the ring gear member 734.

The planetary gearset 740 includes a sun gear member 742, a ring gear member 744, and a planet carrier assembly member 746. The planet carrier assembly member 746 includes a plurality of pinion gears 747 rotatably mounted on a planet carrier 749 and disposed in meshing relationship with both the sun gear member 742 and the ring gear member 744.

The input shaft 17 is continuously interconnected with the sun gear members 722 and 732 through an interconnecting member 770. The planet carrier assembly member 736 and sun gear member 742 are continuously interconnected through an interconnecting member 772. The ring gear member 734 is continuously connected with the transmission housing 60. The output shaft 19 is continuously connected with the planet carrier assembly member 726, and selectively connectible with the ring gear member 744 through the torque-transmitting mechanism 756. The input shaft 17 and interconnecting member 770 are selectively connectible with the planet carrier assembly member 746 through the torque-transmitting mechanism 750. The planet carrier assembly member 746 is selectively connectible with the transmission housing 60 through the torque-transmitting mechanism 758, and is selectively connectible with the ring gear member 724 through the torque-transmitting mechanism 752. The ring gear members 724 and 744 are selectively interconnectible through the torque-transmitting mechanism 754.

It should be noted that the ring gear member 724 is normally not continuously interconnected with any other component of the planetary transmission 714, and the ring gear member 744, as well as the planet carrier assembly member 746, are not continuously interconnected with any other component of the planetary transmission 714.

The truth table of FIG. 16 describes the engagement sequence for the torque-transmitting mechanisms in order to provide a reverse speed ratio and seven forward speed ratios between the input shaft 17 and the output shaft 19 through the planetary gear arrangement 718. The truth table also provides a numerical example of the ratio values that can be obtained for the speed ratios. The numerical values are established utilizing the ring gear/sun gear tooth ratios of the planetary gearsets 720, 730, and 740, as represented by R1/S1, R2/S2, and R3/S3 respectively.

Those skilled in the art will recognize that the numerical values for the reverse speed ratio and the seventh forward speed ratio are determined by the ring gear/sun gear tooth ratios of the planetary gearsets 730 and 740. The first forward speed ratio, fourth forward speed ratio, and sixth forward speed ratio have numerical values determined utilizing the ring gear/sun gear tooth ratios of all three planetary gearsets 720, 730, and 740. The second forward speed ratio has a numerical value determined utilizing the ring gear/sun gear tooth ratio of the planetary gearset 720. The third forward speed ratio has a numerical value determined utilizing the ring gear/sun gear tooth ratios of the planetary gearsets 720 and 730. The fifth forward speed ratio has a numerical value of one.

The chart in FIG. 16 provides the ratio steps between adjacent forward speed ratios when the planetary gear arrangement 718 is used as either a six-speed transmission or a seven-speed transmission.

Figures 17, 18:
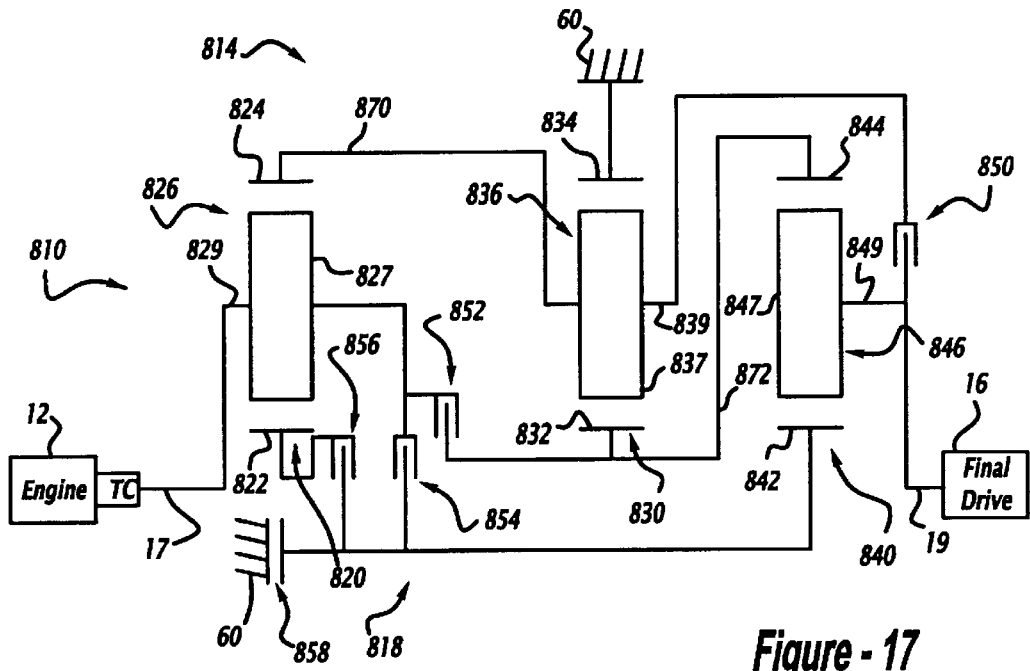
FIG. 17 is a schematic representation of a powertrain utilizing another family member incorporating the present invention.
FIG. 18 is a truth table and operating chart defining some of the operating characteristics of the transmission family member shown in FIG. 17, and the engagement sequence and combinations for the torque-transmitting mechanisms.

A powertrain 810, shown in FIG. 17, includes the engine and torque converter 12, a planetary transmission 814, and the final drive mechanism 16. The planetary transmission 814 includes the input shaft 17, a planetary gear arrangement 818, and the output shaft 19. The planetary gear arrangement 818 includes three planetary gearsets 820, 830, and 840, and five torque-transmitting mechanisms 850, 852, 854, 856, and 858. The torque-transmitting mechanisms 850, 852, 854, and 856 are of the rotating type torque-transmitting mechanisms, commonly termed clutches, and the torque-transmitting mechanism 858 is of the stationary type torque-transmitting mechanisms, commonly termed a brake.

The planetary gearset 820 includes a sun gear member 822, a ring gear member 824, and a planet carrier assembly member 826. The planet carrier assembly member 826 includes a plurality of pinion gears 827 rotatably mounted on a planet carrier 829 and disposed in meshing relationship with both the sun gear member 822 and the ring gear member 824.

The planetary gearset 830 includes a sun gear member 832, a ring gear member 834, and a planet carrier assembly member 836. The planet carrier assembly member 836 includes a plurality of pinion gears 837 rotatably mounted on a planet carrier 839 and disposed in meshing relationship with both the sun gear member 832 and the ring gear member 834.

The planetary gearset 840 includes a sun gear member 842, a ring gear member 844, and a planet carrier assembly member 846. The planet carrier assembly member 846 includes a plurality of pinion gears 847 rotatably mounted on a planet carrier 849 and disposed in meshing relationship with both the sun gear member 842 and the ring gear member 844.

The ring gear member 824 and planet carrier assembly member 836 are continuously interconnected by an interconnecting member 870, and also selectively connectible with the output shaft 19 through the torque-transmitting mechanism 850. The sun gear member 832 and ring gear member 844 are continuously interconnected with an interconnecting member 872, and selectively interconnectible with the input shaft 17 and planet carrier assembly member 826 through the torque-transmitting mechanism 852. The ring gear member 834 is continuously connected with the transmission housing 60. The input shaft 17 and planet carrier assembly member 826 are also selectively connectible with the sun gear member 842 through the torque-transmitting mechanism 854. The sun gear member 842 is selectively connectible with the sun gear member 822 through the torque-transmitting mechanism 856, and selectively connectible with the transmission housing 60 through the torque-transmitting mechanism 858.

The truth table in FIG. 18 describes the engagement sequence and combination of engagements for the torque-transmitting mechanisms in order to establish a reverse speed ratio and seven forward speed ratios through the planetary gear arrangement 818 between the input shaft 17 and the output shaft 19. As with the family member shown in FIG. 15, this family member 818 also provides seven forward speed ratios. The truth table also provides an example of numerical values that can be obtained in the reverse speed ratio and the seven forward speed ratios within the planetary gear arrangement 818 when the torque-transmitting mechanism engagement is established as shown in the truth table. These numerical values have been determined utilizing the ring gear/sun gear tooth ratios of the planetary gearsets 820, 830, and 840, which are shown by way of example as R1/S1, R2/S2, and R3/S3 respectively.

The chart of FIG. 18 describes the ratio steps between adjacent forward speed ratios for both a six-speed transmission and a seven-speed transmission.

Those skilled in the art will recognize that the numerical value for the reverse speed ratio is determined utilizing the ring gear/sun gear tooth ratios of the planetary gearsets 830 and 840. The numerical value for the first forward speed ratio is determined utilizing the ring gear/sun gear tooth ratio of the planetary gearset 830. The numerical value for the second forward speed ratio is determined utilizing the ring gear/sun gear tooth ratio of the planetary gearset 840. The numerical value for the third forward speed ratio is one, or a direct drive. The numerical value for the fourth forward speed ratio, the sixth forward speed ratio, and the seventh forward speed ratio are determined utilizing the ring gear/sun gear tooth ratios of all three planetary gearsets 820, 830, and 840. The numerical value for the fifth forward speed ratio is determined utilizing the ring gear/sun gear tooth ratios of the planetary gearsets 830 and 840.

Figures 19, 20:
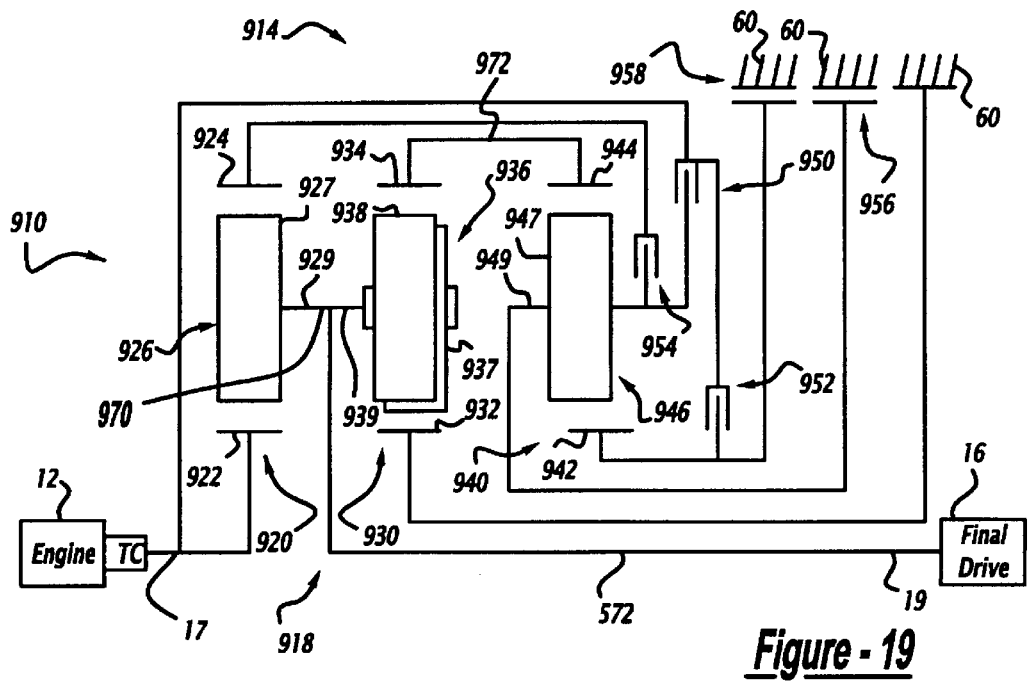
FIG. 19 is a schematic representation of a powertrain utilizing another family member incorporating the present invention.
FIG. 20 is a truth table and operating chart defining some of the operating characteristics of the transmission family member shown in FIG. 19, and the engagement sequence and combinations for the torque-transmitting mechanisms.

A powertrain 910, shown in FIG. 19, includes the engine and torque converter 12, a planetary transmission 914, and the final drive mechanism 16. The planetary transmission 914 includes the input shaft 17, a planetary gear arrangement 918, and the output shaft 19. The planetary gear arrangement 918 includes three planetary gearsets 920, 930, and 940, and five torque-transmitting mechanisms 950, 952, 954, 956, and 958. The torque-transmitting mechanisms 950, 952, and 954 are of the rotating type torque-transmitting mechanisms, commonly termed clutches, and the torque-transmitting mechanisms 956 and 958 are of the stationary type torque-transmitting mechanisms, commonly termed brakes.

The planetary gearset 920 includes a sun gear member 922, a ring gear member 924, and a planet carrier assembly member 926. The planet carrier assembly member 926 includes a plurality of pinion gears 927 rotatably mounted on a planet carrier 929 and disposed in meshing relationship with both the sun gear member 922 and the ring gear member 924.

The planetary gearset 930 includes a sun gear member 932, a ring gear member 934, and a planet carrier assembly member 936. The planet carrier assembly member 936 includes a plurality of pairs of intermeshing pinion gears 937 and 938 that are rotatably mounted on a planet carrier 939 and disposed in meshing relationship with the sun gear member 932 and the ring gear member 934, respectively.

The planetary gearset 940 includes a sun gear member 942, a ring gear member 944, and a planet carrier assembly member 946. The planet carrier assembly member 946 includes a plurality of pinion gears 947 rotatably mounted on a planet carrier 949 and disposed in meshing relationship with both the sun gear member 942 and the ring gear member 944.

The planet carrier assembly member 926 and planet carrier assembly member 936 are continuously interconnected with an interconnecting member 970, which is also continuously interconnected with the output shaft 19. The ring gear members 934 and 944 are continuously interconnected by an interconnecting member 972. The sun gear member 932 is continuously connected with the transmission housing 60. The input shaft 17 is continuously connected with the sun gear member 922, and selectively connectible with the planet carrier assembly member 946 through the torque-transmitting mechanism 950. The planet carrier assembly member 946 is selectively connectible with the ring gear member 924 through the torque-transmitting mechanism 954, and with transmission housing 60 through the torque-transmitting mechanism 956. The sun gear member 942 is selectively interconnectible with the input shaft 17 through the torque-transmitting mechanism 952, and selectively interconnectible with the transmission housing 60 through the torque-transmitting mechanism 958.

The truth table of FIG. 20 describes the engagement combination and sequences for the torque-transmitting mechanisms in order to establish a reverse speed ratio and six forward speed ratios between the input shaft 17 and the output shaft 19 through the planetary gear arrangement 918. The truth table also provides an example of numerical values for these ratios in utilizing the ring gear/sun gear tooth ratios of the planetary gearsets 920, 930, and 940, as represented by R1/S1, R2/S2, and R3/S3 respectively.

Those skilled in the art will recognize that the numerical value for the reverse speed ratio is determined utilizing the ring gear/sun gear tooth ratios of the planetary gearsets 930 and 940. The numerical value for the first forward speed ratio is determined utilizing the ring gear/sun gear tooth ratio of the planetary gearset 920. The numerical values for the second and third forward speed ratios are determined utilizing the ring gear/sun gear tooth ratios of all three planetary gearsets 920, 930, and 940. The numerical value for the fourth forward speed ratio is one. The numerical value for the fifth forward speed ratio is determined utilizing the ring gear/sun gear tooth ratio of the planetary gearset 930. The numerical value for the sixth forward speed ratio is determined utilizing the ring gear/sun gear tooth ratios of the planetary gearsets 930 and 940.

The chart of FIG. 20 describes the value for the ratio steps between adjacent forward speed ratios as well as the ratio step between the reverse and the first forward speed ratio. It is also evident from the truth table that all of the single step forward interchanges are of the single transition variety, and all of the double step forward interchanges are also of the single transition variety.

Figures 21, 22:
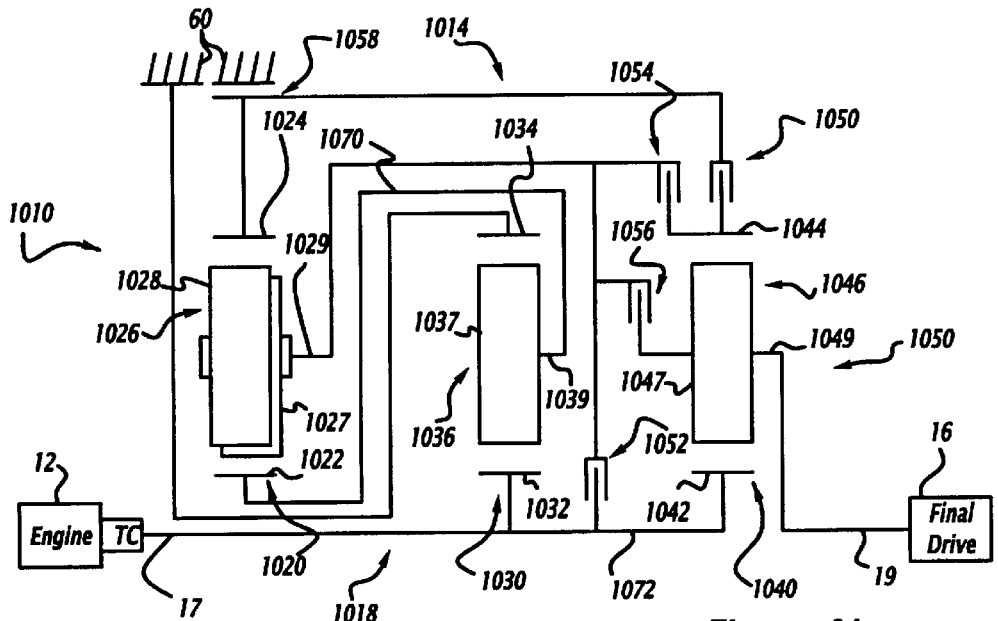
FIG. 21 is a schematic representation of a powertrain utilizing another family member incorporating the present invention.
FIG. 22 is a truth table and operating chart defining some of the operating characteristics of the transmission family member shown in FIG. 21, and the engagement sequence and combinations for the torque-transmitting mechanisms.

A powertrain 1010, shown in FIG. 21, includes the engine and torque converter 12, a planetary transmission 1014, and the final drive mechanism 16. The planetary transmission 1014 includes the input shaft 17, a planetary gear arrangement 1018, and the output shaft 19. The planetary gear arrangement 1018 includes three planetary gearsets 1020, 1030, and 1040, and five torque-transmitting mechanisms 1050, 1052, 1054, 1056, and 1058. The torque-transmitting mechanisms 1050, 1052, 1054, and 1056 are of the rotating type torque-transmitting mechanisms, commonly termed clutches, and the torque-transmitting mechanism 1058 is of the stationary type torque-transmitting mechanisms, commonly termed a brake.

The planetary gearset 1020 includes a sun gear member 1022, a ring gear member 1024, and a planet carrier assembly member 1026. The planet carrier assembly member 1026 includes a pair of intermeshing pinion gears 1027 and 1028 rotatably mounted on a planet carrier 1029 and disposed in meshing relationship with both the sun gear member 1022 and the ring gear member 1024.

The planetary gearset 1030 includes a sun gear member 1032, a ring gear member 1034, and a planet carrier assembly member 1036. The planet carrier assembly member 1036 includes a plurality of pinion gears 1037 rotatably mounted on a planet carrier 1039 and disposed in meshing relationship with both the sun gear member 1032 and the ring gear member 1034.

The planetary gearset 1040 includes a sun gear member 1042, a ring gear member 1044, and a planet carrier assembly member 1046. The planet carrier assembly member 1046 includes a plurality of pinion gears 1047 rotatably mounted on a planet carrier 1049 and disposed in meshing relationship with both the sun gear member 1042 and the ring gear member 1044.

The sun gear member 1022 and planet carrier assembly member 1036 are continuously interconnected by an interconnecting member 1070. The sun gear members 1032 and 1042 are continuously interconnected by an interconnecting member 1072, and also continuously interconnected with the input shaft 17. The ring gear member 1034 is continuously connected with the transmission housing 60. The output shaft 19 is continuously connected with the planet carrier assembly member 1046, and selectively connectible with the planet carrier assembly member 1026 through the torque-transmitting mechanism 1056. The input shaft 17 is selectively connectible with the planet carrier assembly member 1026 through the torque-transmitting mechanism 1052. The ring gear member 1044 is selectively connectible with the ring gear member 1024 through the torque-transmitting mechanism 1050, and selectively interconnectible with the planet carrier assembly member 1026 through the torque-transmitting mechanism 1054. The ring gear member 1024 is selectively interconnectible with the transmission housing 60 through the torque-transmitting mechanism 1058.

It should be noted that the ring gear member 1024, the planet carrier assembly member 1026, and ring gear member 1044 are normally noncontinuously connected members of the planetary gear arrangement 1018. These members are selectively interconnectible with other transmission members, however, they are not continuously connected to any gear member, or the input shaft, or the output shaft.

The truth table in FIG. 22 provides a depiction of the engagement combinations and sequence for the torque-transmitting mechanisms in order to establish a reverse speed ratio and six forward speed ratios between the input shaft 17 and the output shaft 19 through the planetary gear arrangement 1018. The truth table also provides an example of numerical ratios that can be obtained with the planetary gear arrangement 1018 when the ring gear/sun gear tooth ratios of the planetary gearsets 1020, 1030, and 1040 have the numerical values represented by R1/S1, R2/S2, and R3/S3 respectively.

Those skilled in the art will recognize that the reverse speed ratio is determined utilizing the ring gear/sun gear tooth ratios of the planetary gearsets 1020 and 1030. The first forward speed ratio, fourth forward speed ratio, and fifth forward speed ratio all have numerical values determined utilizing the ring gear/sun gear tooth ratios of all three planetary gearsets 1020, 1030, and 1040. The second forward speed ratio has a numerical value determined utilizing the ring gear/sun gear tooth ratio of the planetary gearset 1040. The third forward speed ratio has a numerical value determined utilizing the ring gear/sun gear tooth ratios of the planetary gearsets 1030 and 1040. The numerical value of the six forward speed ratio is one, or a direct drive.

Also shown in FIG. 22 is a chart which provides the numerical values for the ratio steps between adjacent forward speed ratios, and between the reverse and the first forward speed ratio. These numerical values are determined from the numerical examples of the ratios given in the truth table.

What is claimed is:

1. A transmissions comprising:
    an input shaft adapted to deliver power to said transmission;
    an output shaft adapted to deliver power from said transmission;
    a stationary housing;
    a first planetary gearset having first, second, and third members;
    a second planetary gearset having first, second, and third members;
    a third planetary gearset having first, second, and third members;
    a first interconnecting member continuously interconnecting said first member of said first planetary gearset with said first member of said second planetary gearset;
    a second interconnecting member continuously interconnecting said second member of said second planetary gearset with said first member of said third planetary gear set;
    said third member of said second planetary gearset being continuously connected with said stationary housing, said input shaft being continuously connected with at least one member of one of said planetary gearsets, said output shaft being continuously connected with at least one member of one of said planetary gearsets not connected with said input shaft; and
    first, second, third, fourth, and fifth selectively operable torque transmitting mechanisms that selectively connect members of said planetary gearsets with other members of said planetary gearsets, said input shaft, said output shaft, or said transmission housing, said torque transmitting mechanisms being engaged in combinations of two to establish at least six forward speed ratios and a reverse speed ratio between said input shaft and said output shaft.

2. The transmissions defined in claim 1 further comprising:
    said first selectively engageable torque transmitting mechanism selectively interconnecting a member of said first planetary gearset with any one of a group consisting of said input shaft, said output shaft, said first interconnecting member, said second interconnecting member, a member of said second planetary gearset, and a member of said second planetary gearset;
    said second selectively engageable torque transmitting mechanism selectively interconnecting a member of said second planetary gearset with any one of a group consisting of said input shaft, said output shaft, said first interconnecting member, said second interconnecting member, a member of said first planetary gearset, and a member of said second planetary gearset;
    said third selectively engageable torque transmitting mechanism selectively interconnecting a member of said third planetary gearset with any one of a group consisting of said input shaft, said output shaft, said first interconnecting member, said second interconnecting member, a member of said first planetary gearset, and a member of said second planetary gearset;
    said fourth selectively engageable torque transmitting mechanism selectively interconnecting any one of a group consisting of said stationary housing and a member of one of said planetary gearsets with any one of a group consisting of a member of said first planetary gearset, a member of said second planetary gearset, and a member of said third planetary gearset; and
    said fifth selectively engageable torque transmitting mechanism selectively interconnecting said stationary housing with any one of a group consisting of a member of said first planetary gearset, a member of said second planetary gearset, and a member of said third planetary gearset.

3. The transmissions defined in claim 1 further wherein:

said first member of each of said planetary gearsets is any one of a first group consisting of a sun gear member, a ring gear member, and a planet carrier assembly member, said second member of each of said planetary gearsets is any one of a second group consisting of the members of the first group that are not said first member, and said third member of each of said planetary gearsets is the remaining member of said second group that is not said second member.

4. The transmissions defined in claim 1 further wherein:

said first member of said first planetary gearset is any one of a first group consisting of a first sun gear member, a first ring gear member, and a first planet carrier assembly member;

said first member of said second planetary gearset is any one of a second group consisting of a second sun gear member, a second ring gear member, and a second planet carrier assembly member; and said members interconnected by said first interconnecting member are a combination of any one of a third group consisting of any one member of said first group and any one member of said second group.

5. The transmissions defined in claim 4 further wherein:

said second member of said second planetary gearset is any one of a first sub-group consisting of the members of the second group that are not the first member, said first member of said third planetary gearset is any one of a second sub-group consisting of a sun gear member a ring gear member, and a planet carrier assembly member; and said members interconnected by said second interconnecting member are a combination of any one of a third sub-group consisting of any one member of said first sub-group and any one member of said second sub-group.

6. A transmission comprising:

an input shaft;

an output shaft;

a transmission housing;

a first planetary gearset having first, second, and third members;

a second planetary gearset having first, second, and third members;

a third planetary gearset having first, second, and third members;

a first interconnecting member continuously interconnecting said first member of said first planetary gearset with said first member of said second planetary gearset;

a second interconnecting member continuously interconnecting said second member of said second planetary gearset with said first member of said third planetary gearset;

said third member of said second planetary gearset being continuously connected with said transmission housing;

said input shaft being continuously interconnected with any one of a group consisting of said first interconnecting member, said second interconnecting member, said second member of one of said first and third planetary gearset;

said output shaft being continuously interconnected with any one of a group consisting of said first interconnecting member, said second member of said first planetary gearset, and said second member of said third planetary gearset that is not connected with said input shaft;

a first torque transmitting mechanism selectively interconnecting said input shaft with any one of a group consisting of said third member of said third planetary gearset, said third member of said first planetary gearset, and said second member of said third planetary gearset;

a second torque transmitting mechanism selectively interconnecting any one of a group consisting of said first interconnecting member, said third member of said first planetary gearset, said second member of said first planetary gearset, and said input shaft with any one of a group consisting of said second interconnecting member, said third member of said third planetary gearset, and said second member of said third planetary gearset;

a third torque transmitting mechanism selectively interconnecting any one of a group consisting of said input shaft and said third member of said first planetary gearset with any one of a group consisting of said second interconnecting member, said third member of said third planetary gearset, and said second member of said third planetary gearset, and said output shaft;

a fourth torque transmitting mechanism selectively interconnecting any one of a group consisting of said transmission housing and said output shaft with any one of a group consisting of said first interconnecting member, said second interconnecting member, said third member of said first planetary gearset, said second member of said third planetary gearset, and said third member of said third planetary gearset;

fifth torque transmitting mechanism selectively interconnecting said transmission housing with any one of a group consisting of said first interconnecting member, said second interconnecting member, said second member of said first planetary gearset, said third member of said first planetary gearset, said second member of said third planetary gearset, and said third member of said third planetary gearset; and said torque transmitting mechanisms being selectively engaged in combinations of two to establish at least six forward speed ratios and one reverse ratio between said input shaft and said output shaft.

* * * * *